(12) United States Patent
Kosuge et al.

(10) Patent No.: US 6,880,237 B2
(45) Date of Patent: Apr. 19, 2005

(54) WORK CHUCKING/INSERTING APPARATUS AND ASSEMBLING UNIT

(75) Inventors: Kazuhiro Kosuge, 21-10, Yakata 3-chome, Izumi-ku, Sendai-shi, Miyagi-ken (JP); Katsuyoshi Tachibana, Tokyo (JP); Takahide Nakayama, Tokyo (JP); Takenori Hirakawa, Tokyo (JP); Takeshi Mitsunaga, Tokyo (JP)

(73) Assignees: Kazuhiro Kosuge (JP); Hirata Corporation (JP)

( * ) Notice: Subject to any disclaimer, the term of this patent is extended or adjusted under 35 U.S.C. 154(b) by 416 days.

(21) Appl. No.: 09/802,900

(22) Filed: Mar. 12, 2001

(65) Prior Publication Data
US 2001/0024044 A1 Sep. 27, 2001

(30) Foreign Application Priority Data

Mar. 15, 2000 (JP) .......................... 2000-117153
Feb. 16, 2001 (JP) .......................... 2001-040832

(51) Int. Cl.⁷ .............................................. B23P 21/00
(52) U.S. Cl. .................... 29/714; 29/243; 29/281.4; 29/559; 269/156; 279/110; 279/123
(58) Field of Search ................ 29/559, 714, 222, 29/243, 248, 281.4; 269/54.3, 156, 157, 164, 265, 287, 288; 279/62, 110, 123, 66

(56) References Cited

U.S. PATENT DOCUMENTS

| | | | | |
|---|---|---|---|---|
| 848,036 A | * | 3/1907 | Kruger | 269/156 |
| 887,103 A | * | 5/1908 | Lane | 269/156 |
| 1,367,622 A | * | 2/1921 | Monckmeier | 29/222 |
| 1,536,496 A | * | 5/1925 | Hill | 29/222 |
| 1,741,110 A | * | 12/1929 | Heinrich | 29/222 |
| 3,244,430 A | * | 4/1966 | Buck | 279/121 |
| 3,263,535 A | * | 8/1966 | Zurcher | 269/156 |
| 3,824,674 A | * | 7/1974 | Inoyama et al. | 29/281.4 |
| 4,084,629 A | * | 4/1978 | Kreusler | 144/154.5 |
| 4,179,783 A | * | 12/1979 | Inoyama et al. | 29/281.5 |
| 4,537,557 A | * | 8/1985 | Whitney | 294/106 |
| 4,550,922 A | * | 11/1985 | Hall et al. | 279/119 |
| 4,561,663 A | * | 12/1985 | Ferraro | 279/123 |
| 4,640,518 A | * | 2/1987 | Ferraro | 279/123 |

(Continued)

FOREIGN PATENT DOCUMENTS

| | | |
|---|---|---|
| JP | 59-115129 | 12/1982 |
| JP | 59-156629 | 2/1983 |
| JP | 4-256526 | 2/1991 |
| JP | 5-108108 | 5/1991 |
| JP | 8-168927 | 12/1994 |

Primary Examiner—Essama Omgba
(74) Attorney, Agent, or Firm—Lorusso, Loud & Kelly

(57) ABSTRACT

A work chucking/inserting device for chucking and inserting a work into an insertion hole (cylinder bore) in alignment with the hole, including three or more chuck fingers, the chuck fingers being arranged in circumferentially spaced positions and mounted for advancing and retracting radially. Inner surfaces of the chuck fingers serve as chuck surfaces for chucking the work, and outer surfaces of the chuck fingers are tapered at least at tip end portions radially inward toward the tips for contact with an inlet of the insertion hole. The work chucking/inserting device further includes a tracer mechanism which causes the axis of a conical surface defined by the outer surfaces of the chuck fingers to become aligned with the axis of the insertion hole when the outer surfaces of the chuck fingers contact the inlet of the insertion hole. A pushing mechanism is included for pushing the work toward the insertion hole. The work chucking/inserting device can handle various sizes of workpieces with a simple structure, within a short time and with high working efficiency.

21 Claims, 12 Drawing Sheets

U.S. PATENT DOCUMENTS

| | | | | |
|---|---|---|---|---|
| 4,791,588 A | * | 12/1988 | Onda et al. | 700/260 |
| 4,818,173 A | * | 4/1989 | Khusro | 338/15 |
| 4,830,565 A | * | 5/1989 | Bucher et al. | 294/115 |
| 4,896,431 A | * | 1/1990 | Danmoto et al. | 33/520 |
| 4,918,991 A | * | 4/1990 | Bucher et al. | 376/261 |
| 4,925,360 A | * | 5/1990 | Kato | 414/730 |
| 4,982,939 A | * | 1/1991 | Yoshikawa et al. | 269/155 |
| 5,005,279 A | * | 4/1991 | Kooiker | 279/901 |
| 5,168,622 A | * | 12/1992 | Peyroux | 29/709 |
| 5,201,501 A | * | 4/1993 | Fassler | 269/156 |
| 5,292,139 A | * | 3/1994 | Gaillard | 279/123 |
| 5,619,782 A | * | 4/1997 | Tanaka et al. | 29/281.4 |
| 5,765,820 A | * | 6/1998 | Marusiak | 269/156 |
| 5,842,703 A | * | 12/1998 | Antoni | 279/123 |
| 5,911,413 A | * | 6/1999 | Jun | 269/156 |
| 5,953,804 A | * | 9/1999 | Dragotta | 29/281.4 |
| 6,098,972 A | * | 8/2000 | Klimach et al. | 269/139 |
| 6,141,862 A | * | 11/2000 | Matsui et al. | 29/278 |
| 6,209,444 B1 | * | 4/2001 | Murakami et al. | 92/169.1 |
| 6,293,763 B1 | * | 9/2001 | Yokomachi et al. | 417/269 |
| 6,354,606 B1 | * | 3/2002 | Finn, III | 279/110 |

* cited by examiner

WORK CHUCKING/INSERTING APPARATUS AND ASSEMBLING UNIT

BACKGROUND OF THE INVENTION

1. Field of the Invention

The present invention relates to a work chucking/inserting apparatus and, more particularly, to a work chucking/inserting apparatus of simple structure capable of handling various sizes of works for alignment with and insertion into an insertion hole within a short time and with high working efficiency.

2. Description of the Prior Art

In inserting a work into an insertion hole with use of a machine such as a robot, conventional techniques correct a deviation between the position of the insertion hole and the present position of the work by using a jig for insertion or using a Vision (a two-dimensional visual device) to detect the position of the insertion hole.

For example, in the case where a jig for insertion is used (Japanese Patent Laid Open No. 115 129/84), as shown in FIG. 17, the inserting jig 01 has a through-hole with an inlet opening larger than an insertion hole 02. The through-hole tapers or gently curves inward and leads to an outlet (insertion port) which is of the same shape as the opening of the insertion hole 02 located on the side opposite the inlet of the inserting jig 01.

The inserting jig 01 having such a shape is first placed on the opening of the insertion hole 02 formed in an object (e.g., cylinder) 05 so as to be in approximate alignment with the insertion hole 02. At this time, the axis of the inserting jig 01 and that of the insertion hole 02 are not in exact alignment with each other. In this state, an expander 03 having plural fingers capable of expanding outwardly is inserted into the insertion hole 02 and then the plural fingers are expanded outwards. As a result, the inserting jig 01 moves and the axis thereof comes into alignment with the axis of the insertion hole 02 (see FIG. 18) and is fixed therein.

Next, a workpiece (e.g., piston) 04 is pushed in toward the insertion hole 02, following the tapered shape of the inserting jig 01, passing through the outlet of the inserting jig 01 and entering into the insertion hole 02 (see FIG. 19).

However, in such a conventional method which uses the inserting jig 01, it is necessary that the shape of the jig 01 be in conformity with the shape of the insertion hole; that is, it is necessary to provide a different inserting jig for each type of insertion hole. Besides, extra working time is required for the aligning work using the expander 03. Under these circumstances, in a multi-type mixed production line handling more than three types, the application of the method using the inserting jig 01 becomes difficult. For example, in an engine assembling line, an example of a multi-type mixed production line, the process of inserting a piston into a cylinder bore is in many cases carried out by manual operation.

Another known method using a jig is disclosed in Japanese Patent Laid Open No. 256526/92. In this later method a position detecting jig is moved in searching for the position of the insertion hole with use of a force control. In this method, however, a work chucking/inserting apparatus is required to shift the jig and a component from one to the other. This is time-consuming and a shift error occurs upon repetition of each such jig shifting operation. Methods which utilize similar tracing mechanisms are disclosed in Japanese Patent Laid Open Nos. 108108/93 and 168927/96, in which methods the position of an insertion hole is detected while allowing a work to contact and follow the insertion hole. But both methods involve problems such as the damage of components because the work itself is brought into contact with the insertion hole for detecting the position of the hole.

In using a Vision (a two-dimensional visual device), a positional deviation between a workpiece and an insertion hole is detected by the Vision, position data for a robot for chucking and conveying the work are corrected, and the work is inserted into the insertion hole at the exact robot position. However, the Vision is relatively expensive. Moreover, the accuracy of the measurement made by the Vision can be no higher than the resolution thereof, so for a highly accurate detection of the hole position it is necessary to take a close-up of the hole, requiring three or more cameras in the case of a large hole. Any attempt to enhance the accuracy results in a further increase in cost. Moreover, correction for matching both Vision and robot coordinate systems is troublesome and a complete matching is impossible, that is, the occurrence of error is unavoidable. Mechanical changes e.g., changes in weight and temperature, and shock, a change in illumination, or a change in optical conditions of the hole also give rise to error.

SUMMARY OF THE INVENTION

It is an object of the present invention to provide a workpiece chucking/inserting apparatus capable of solving the above-mentioned problems of the conventional means for inserting a workpiece into an insertion hole in alignment with the hole, also capable of handling various sizes of workpieces and capable of inserting a workpiece into an insertion hole in a state aligned with the hole within a short time and with high working efficiency, yet having a simple structure.

For achieving the above-mentioned object, in a first aspect of the present invention there is provided a work chucking/inserting apparatus for chucking a work and inserting the work into an insertion hole in alignment with the hole, the work chucking/inserting apparatus including three or more chuck fingers, the chuck fingers being arranged in circumferentially spaced positions around a central axis and capable of advancing and retreating radially, inner surfaces of the chuck fingers serving as chuck surfaces for chucking the work, and outer surfaces of the chuck fingers being tapered at least at tip end portions, inward toward the tips, for contact with an inlet of the insertion hole.

The outer surfaces of the three or more chuck fingers arranged in spaced circumferential positions assume a generally conical shape, which is suitable for searching for the position of an insertion hole. When the outer surfaces of the plural chuck fingers having such a shape are brought into equal contact with the inlet of the insertion hole, it becomes possible to detect the position of the insertion hole accurately, and by a simple operation involving fixing the work chucking/inserting apparatus at the detected position and pushing in the work as chucked by the inner surfaces of the chuck fingers toward the insertion hole, it is possible to insert the workpiece into the insertion hole in a state aligned with the hole. This can be done with an extremely simple structure, within a short time and with a high working efficiency. In this case, the work chucking/inserting apparatus, after detecting the position of the insertion hole, memorizes the detected position and goes to a work feed location to retrieve a work.

Because the chuck fingers of the chucking/inserting apparatus can advance and retreat radially, so by adjusting the chuck fingers radially in accordance with the size of the work, it is possible to chuck, or handle, various sizes of works. Thus, this work chucking/inserting apparatus is suitable for use in a multi-type mixed product assembling.

Alternatively, the outer surfaces of the chuck fingers have, at least at their tip end portions surfaces parallel to the central axis and to an inner peripheral surface of the insertion hole for contact with an inlet of the insertion hole. Thus, in this alternative, the outer surfaces of the three chuck fingers, arranged in spaced circumferential positions, assume a generally cylindrical shape, which is suitable for searching for the position of a work insertion hole. When the outer surfaces of the plural chuck fingers having such a shape are brought into equal contact with the inlet of the insertion hole, it becomes possible to detect the position of the insertion hole accurately, and by a simple operation involving fixing the work chucking/inserting apparatus in the detected position and pushing in the work it is possible to insert the work into the insertion hole in a state aligned with the hole.

In another embodiment the present invention provides a work chucking/inserting apparatus including three or more chuck fingers and three or more hole position detecting fingers, the chuck fingers also being arranged in circumferentially spaced positions and capable of advancing and retreating radially, the hole position detecting fingers also being arranged in circumferentially spaced positions and pivotable inwards and outwards, about base end portions thereof as fulcrums. As in the previously described embodiment, the chuck fingers serve as chuck surfaces for chucking the work, and outer surfaces of the hole position detecting fingers are tapered at least at tip end portions thereof, tapering inward toward the tips for contact with an inlet of the insertion hole. The hole position detecting fingers, which are arranged in circumferentially spaced positions, together define a generally conical shape, at least at their tip end portions, which conical shape is suitable for searching for the position of the work insertion hole. When the outer surfaces of the plural hole position detecting fingers having such a shape are brought into equal contact with the inlet of the insertion hole, it is possible to detect the position of the insertion hole accurately. As in the previously described embodiment, a simple operation fixes the work chucking/inserting apparatus in the detected position and allows in the work to be pushed into the insertion hole in a state aligned with the hole. In this case also, the work chucking/inserting apparatus, after detecting the position of the insertion hole, need not go to the work feed location to retrieve the work. Because the chuck fingers of this work chucking/inserting apparatus also advance and retreat radially, it also is suitable for use in a multi-type mixed production line.

In the above, described second embodiment the hole position detecting fingers may be pivotally connected to tip end portions of the chuck fingers. According to this construction, when the work as chucked by the inner surfaces of the chuck fingers is inserted into the insertion hole, only mechanical error between the hole position detecting fingers and the chuck fingers comes into question. Since this error is very small and can be corrected relatively easily, the work can be inserted into the insertion hole accurately in alignment with the hole.

Alternatively, in the second embodiment the hole position detecting fingers may be pivotally connected to a base on which base end portions of the chuck fingers are slidably mounted for radial advance and retreat. Accordingly, when the work as chucked by the inner surfaces of the chuck lingers is inserted into the insertion hole in alignment with the hole, only mechanical error between the hole position detecting fingers and the chuck fingers, through the base portion, comes into question. But since this error is relatively small and can be corrected, the work can be inserted into the insertion hole accurately in alignment with the insertion hole. Moreover, the hole position detecting fingers are pivotally supported in a more firm and stable manner.

The chucking/inserting apparatus may further include a tracer mechanism which, when the outer surfaces of the chuck fingers or of the hole position detecting fingers come into contact with the inlet of the insertion hole, causes the axis of a conical surface defined by the outer surfaces of the three or more chuck fingers or of the three or more hole position detecting fingers to be aligned with the axis of the insertion hole. Thus, by merely advancing the outer surfaces of the chuck fingers or the hole position detecting fingers toward the insertion hole, it is possible to easily detect the position of the insertion hole.

The chucking/inserting apparatus may further include a pushing mechanism for pushing the work toward the insertion hole. With this pushing mechanism, when the position of the insertion hole has been detected, the chuck fingers have chucked the work and the axis of a cylindrical surface formed by the inner surfaces of the chuck fingers has become aligned with the axis of the insertion hole, it immediately becomes possible to push the work into the insertion hole. Thus within a still shorter time and with a still higher working efficiency, the work can be inserted into the insertion hole in alignment with the axis of the hole.

The work chucking/inserting apparatus may include both a tracer mechanism for causing the axis of a conical surface defined by the outer surfaces of the three or more chuck fingers to be aligned with the axis of the insertion hole when the said outer surfaces come into contact with the inlet of the insertion hole, and a pushing mechanism for pushing the work toward the insertion hole.

The inner surfaces of the chuck fingers are formed as chuck surfaces for chucking the work, each having a portion tapered inward toward the tip thereof. Therefore, even if the inner surfaces of the chuck fingers have already chucked the work when the work chucking/inserting apparatus detects the position of the insertion hole, the work chucking/inserting apparatus, after detection of the insertion hole position, stands still in the detected position and only the chuck fingers expand their tips radially outwards, permitting the work to pass therethrough. At this time, the pushing mechanism pushes to cause the work to slide on the tapered portions of the inner surfaces of the chuck fingers. As a result, without danger of disengagement of the work from the chuck fingers, the work can be inserted smoothly into the insertion hole while guided by the tapered portions. Thus, after detection of the insertion hole position, the work chucking/inserting apparatus is not required to memorize the detected position and go to the work feed location to retrieve the work.

The inlet of the insertion hole may be chamfered, in which ease the tip end portions of the chuck fingers may have projections for mating with the chamfered portion when the work is inserted into the insertion hole. As a result, even if the inlet of the insertion hole is chamfered, an inner peripheral surface of the insertion hole and a cylindrical surface formed by the inner surfaces of the chuck fingers become contiguous to each other. Besides, the chuck fingers are received by the chamfered portion and come to a standstill, so even if the work (e.g. piston) has a protuberance (e.g. piston ring) on its outer surface, the work can be inserted smoothly into the insertion hole (e.g., cylinder bore). Thus, such a protuberance is not an obstacle to an aligned insertion of the work into the insertion hole.

The chucking/inserting apparatus is suitable for use where the work is a piston or an assembly of a piston and a connecting rod. When the work is an assembly of a piston and a connecting rod, the insertion hole is a cylinder bore, the chuck fingers chuck the piston, and the hole position detecting fingers also serve as means for chucking the connecting rod.

In another embodiment the end faces of the chuck fingers are flat except for portions close to their inner peripheral edges and can be brought into abutment against a wall surface which surrounds the inlet of the insertion hole. Since the portions close to the inner peripheral edges are tapered inwardly toward their tips for contact with the inlet of the insertion hole, the flat portions of the end faces of the chuck fingers can be allowed to serve as positioning faces for positioning the work chucking/inserting apparatus axially relative to the insertion hole when the same apparatus detects the position of the insertion hole utilizing the tapered portions close to the inner peripheral edges of the end faces of the chuck fingers. As a result, the work chucking/inserting apparatus can be fixed in position axially of the insertion hole. In the foregoing manner it is also possible to eliminate deflection of the axis and to thereby improve the accuracy in detecting the position of the insertion hole.

The aforementioned pushing mechanism may have a vacuum chucking function for holding the work. With the vacuum chucking feature and the chuck fingers holding the work prior to detection of the position of the insertion hole, when the tip ends of the outer surfaces of the chuck fingers are expanded radially outwards to allow the work to pass therethrough or to detect the position of the insertion hole, since the pushing mechanism holds the work by a vacuum, there is no fear of disengagement of the work from the work chucking/inserting apparatus, nor is there any fear of deflection of the apparatus axial orientation, thus permitting the work to be inserted into the insertion hole positively and smoothly. Moreover, since the work is pushed by the pushing mechanism without sliding on the tapered portions of the inner surfaces of the chuck fingers, there is no fear of damage to the work.

A robot may be used to convey the work chucking/inserting apparatus to the position of the insertion hole and to control the orientation of the work chucking/inserting apparatus so that the work is inserted into the insertion hole in alignment with the hole. The tracer control for detecting the position of the insertion hole, the conveyance of the apparatus up to the position of the insertion hole, and control for orientation of the apparatus with respect to the insertion hole, can all be done automatically using the robot.

DETAILED DESCRIPTION OF PREFERRED EMBODIMENTS

A first embodiment of the invention will now be described with reference to FIGS. 1 to 4.

Figure 1:
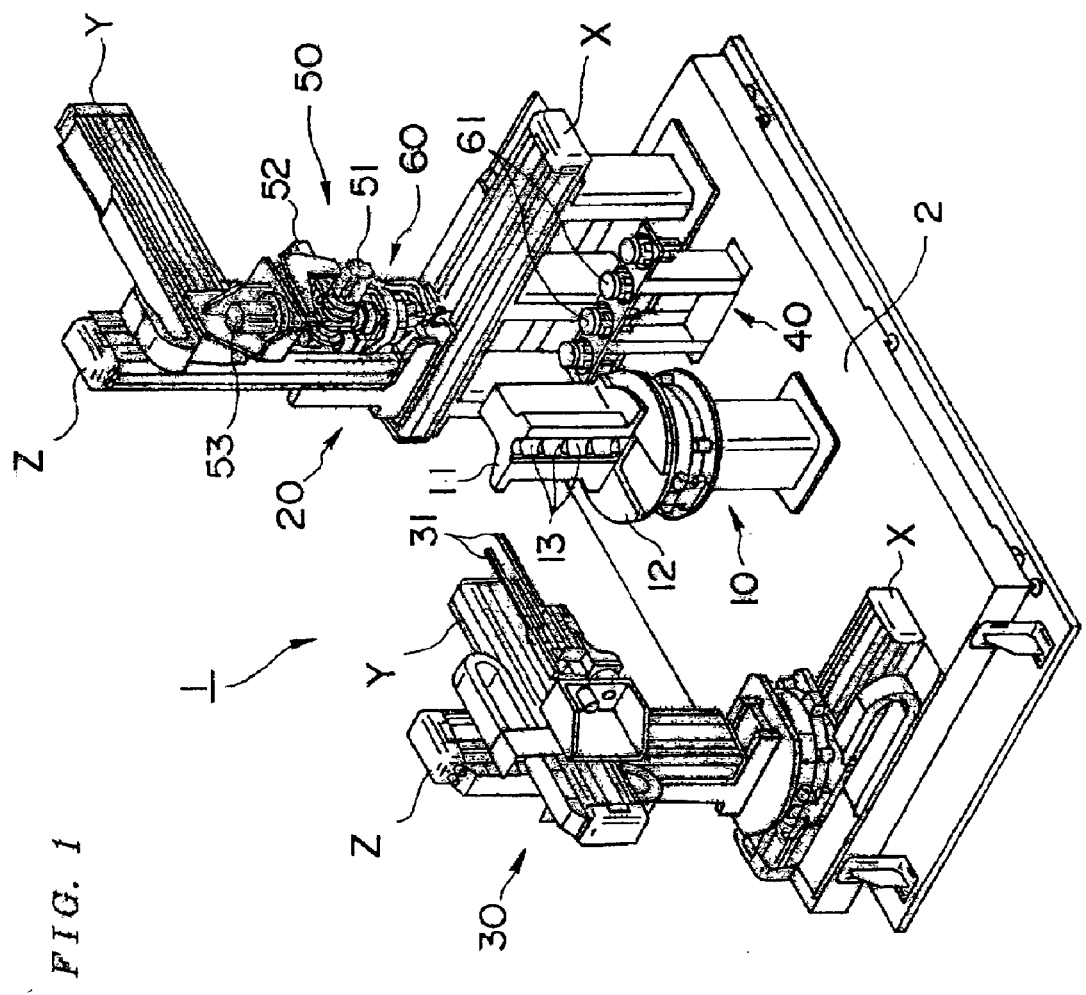
FIG. 1 is a perspective view showing the whole of an assembling unit equipped with an XYZ orthogonal coordinate robot on which is mounted a work chucking/inserting apparatus according to a first embodiment of the invention.

The work chucking/inserting apparatus of this first embodiment is used for inserting a piston into a cylinder bore, in alignment with the bore in an internal combustion engine assembling process. As shown in FIG. 1, in an assembling unit 1 for inserting a piston into a cylinder bore, a work support base 10 is installed centrally of a platform 2, a first XYZ orthogonal coordinate robot (hereinafter referred to as "the first robot") is installed on the right-hand side in FIG. 1 of the platform 2, and a second XYZ orthogonal coordinate robot ("the second robot" hereinafter) 30 is installed on the lefthand side in FIG. 1 of the platform 2. Between the work support base 10 and the first robot 20 is provided a temporary work rest 40.

The work support base 10 is provided on top thereof with a turntable 12 on which is placed a cylinder block 11 as one workpiece. For inserting an assembly (see FIG. 2, hereinafter referred to simply as "assembly") 61 of a piston 62 and a connecting rod 63 into a cylinder bore 13 of the cylinder block 11, the first robot 20 carries the assembly 61 up a position adjacent the cylinder bore 13. The second robot 30 inserts a pair of chuck arms 31 through an opening of the cylinder bore 13 into the interior of the bore, the chuck arms 31 functioning to chuck and guide a tip end portion of the connecting rod 63 to be inserted into the cylinder bore 13. On the temporary work rest 40 are a plurality of assemblies 61, other workpieces, standing by for insertion into cylinder bores 13. The cylinder block 11 has four cylinders and there are provided four assemblies 61.

Figure 2:
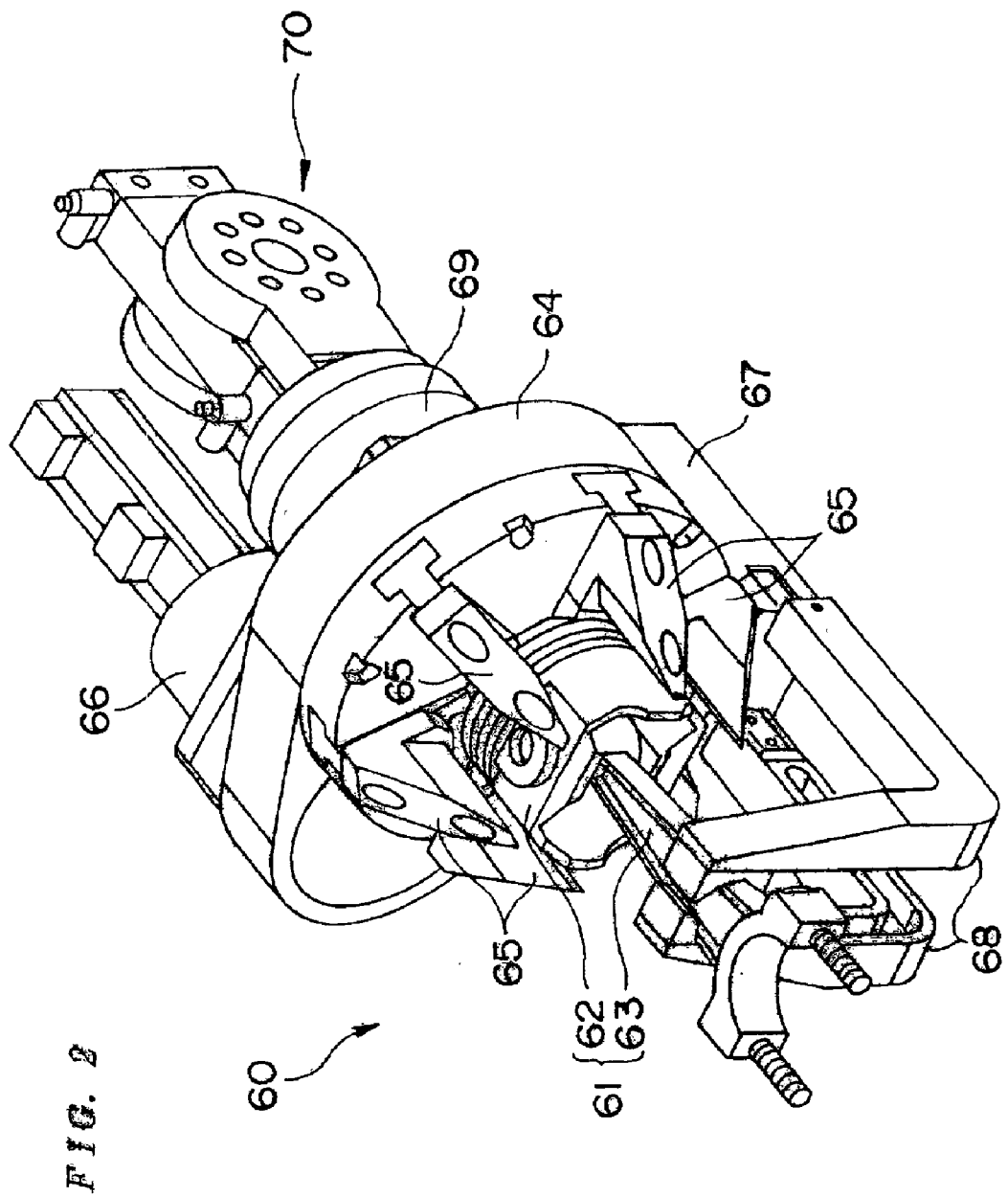
FIG. 2 is a perspective view of the work chucking/inserting apparatus.
Figure 3:
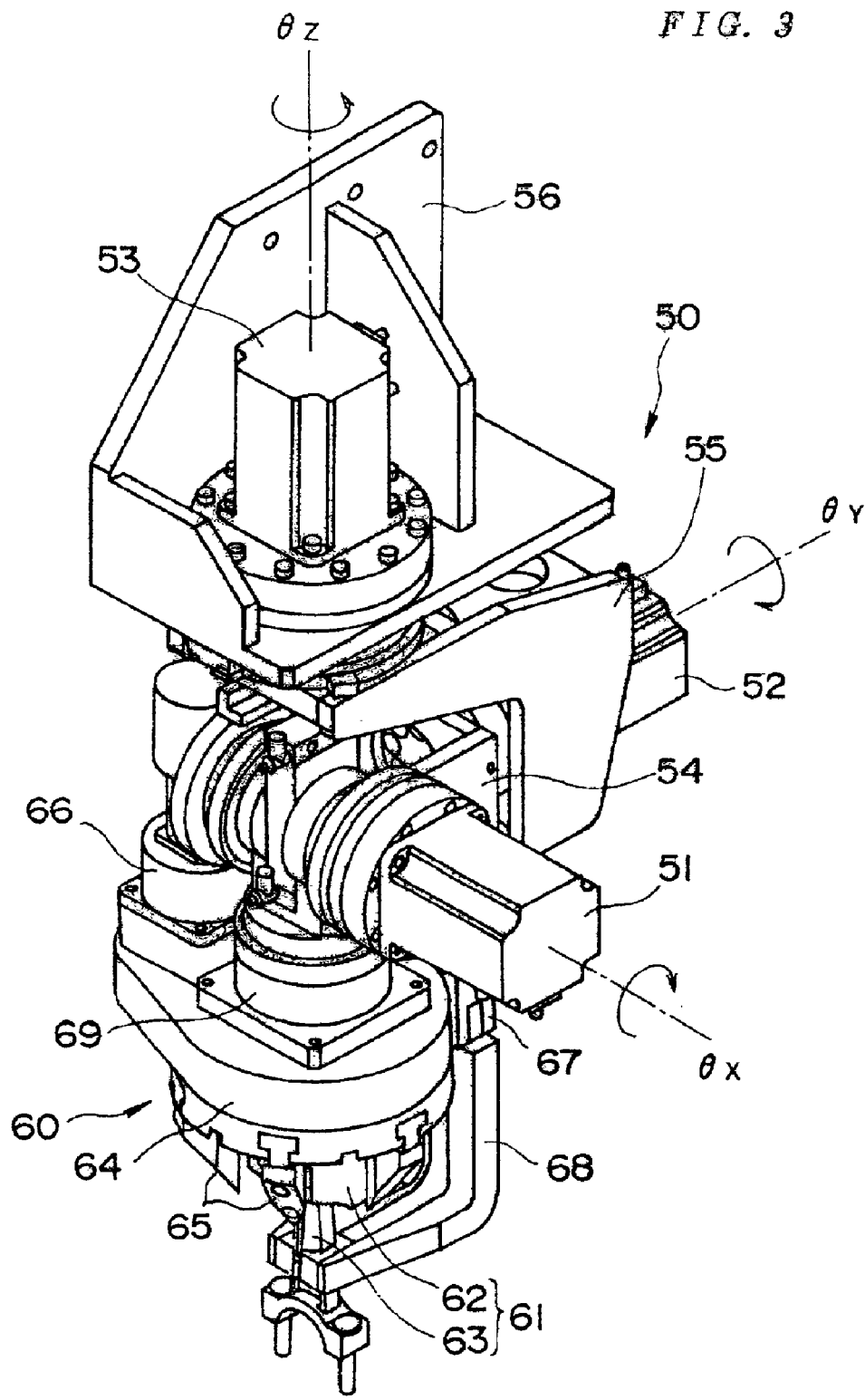
FIG. 3 is a perspective view of a posture control robot for controlling the orientation of the work chucking/inserting apparatus around $\theta_x$ $\theta_y$ $\theta_z$ axes, which robot is interposed between the work chucking/inserting apparatus and the XYZ orthogonal coordinate robot.
Figure 4:
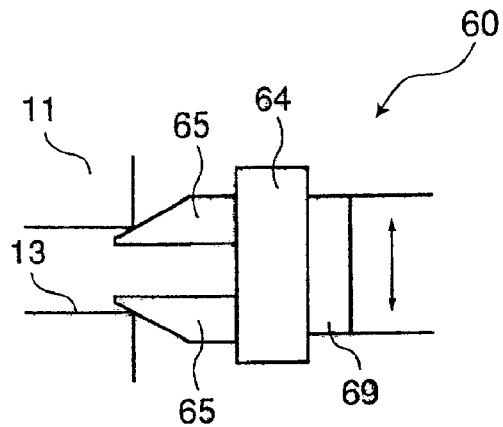
FIG. 4 is an explanatory diagram showing, in a modeled form, the structure of a principal portion of the work chucking/inserting apparatus of the first embodiment.

As shown in FIG. 2, each assembly 61 is chucked by the work chucking/inserting apparatus of this embodiment, indicated at 60. As shown in FIG. 3, the work chucking/inserting apparatus 60 is supported by a posture control robot 50. The posture control robot 50 is equipped with motors 51, 52 and 53 around three shafts $\theta_x \theta_y \theta_z$ for correcting axial orientation and rotational orientation of the assembly 61. As shown in FIG. 1, the posture control robot 50 is fixedly secured to a Y shaft of the first robot 20 and is thereby supported by the first robot 20.

Next, reference will be made below to the structure of the work chucking/inserting apparatus 60.

As shown in FIG. 2, the work chucking/inserting apparatus 60 has six piston chuck fingers 65 projecting in a leftward and downward direction in FIG. 2 from a base portion 64 of the apparatus. The six piston chuck fingers 65 are arranged circumferentially at equal intervals around a central axis and can advance and retreat radially. Inner surfaces of the chuck fingers 65 serve as chuck surfaces for chucking the piston 62, while outer surfaces thereof are tapered at least at their tip end portions so that the closer to their tips, the more inward the taper. The shape formed by combination of all the six piston chuck fingers 65 is a tapered shape which is narrower at their tips, and the outer surfaces thus tapered of the piston chuck fingers can contact the inlet of the cylinder bore 13 being opened toward the first robot 20 side. In the illustrated embodiment, chuck fingers 65 are tapered over the greater part of their length in such a manner that the closer to their tips, the more inward the taper. The tapered portions of the outer surfaces of the piston chuck fingers 65 are arranged on a single (virtual) conical surface. The number of the piston chuck fingers 65 is three or more. The piston chuck fingers 65 are arranged in circumferentially spaced positions, and preferably at equal circumferential intervals.

The mechanism for causing the piston chuck finger 65 to advance and retreat radially on the base portion 64 is a known mechanism. Though not shown, a pin projects from the back of a leg portion of each piston chuck finger 65, and a cam plate formed with a cam groove, which the pin follows, is provided in the interior of the base portion 64. As the cam plate rotates forward and reverse, the pin reciprocates in the cam groove in a relative manner and the piston chuck finger 65 integral with the pin advances and retreats radially. The rotation of the cam plate is performed by a motor 66.

An air chuck 67 is integrally attached to the base portion 64 and a pair of connecting rod chucking arms 68 extend from the air chuck 67 in the same direction as the piston chuck fingers 65. The connecting rod chucking arms 68 are L-shaped and the tips of their L shapes chuck the wider end of the connecting rod 63 in alignment with the piston 62, the connecting rod 63 being attached to the piston 62. By supplying or cutting off the supply of air pressure to the air chuck 67, the paired connecting rod chucking arms 68 are swung toward or away from each other. When the arms 68 swing toward each other, they chuck the wider end of the connecting rod 63.

A force sensor 69 is integral with the back (in FIG. 2) of the base portion 64. When the outer surfaces of the six piston chuck fingers 65 are brought into pressure contact with the inlet of the cylinder bore 13 (see FIG. 4) for detecting the position of the cylinder bore, the force sensor 69 detects the magnitude and direction of a resultant force F of reaction forces which the piston chuck fingers 65 receive from the cylinder bore 13. The resultant force F of the reaction forces comprises force components Fx, Fy, Fz and rotational force components $F_\theta x$, $F_\theta y$, $F_\theta z$ acting around the axis $\theta_x$, $\theta_y$ and $\theta_z$, respectively. Therefore, the resultant force F of the reaction forces which the piston chuck fingers 65 receive from the wall of the cylinder bore 13 can be expressed as follows:

$$F=F(Fx, Fy, Fz, F_\theta x, F_\theta y, F_\theta z)$$

The force components Fx, Fy, Fz, $F_\theta x$, $F_\theta y$ and $F_\theta z$ indicate a relative positional deviation between the cylinder bore 13 and the virtual conical surface defined by the outer surfaces of the six piston chuck fingers 65 or the virtual cylindrical surface (chuck surface) defined by the inner surfaces of the six piston chuck fingers. In this connection, if force components Fx, Fz, $F_\theta x$, $F_\theta y$, and $F_\theta z$ are detected, the position of the work chucking/inserting apparatus having the six piston chuck fingers 65 is corrected repeatedly by movement in XZ directions by use of the first robot 20 and also by rotation quantity control around the $\theta_x$, $\theta_y$ and $\theta_z$ axes with use of the posture control robot 50, so that those force components are eliminated, that is, only the force component $F_y$ in the Y direction remains.

In this way the position of the work chucking/inserting apparatus 60 is corrected repeatedly following the cylinder bore 13. When the aforesaid force components have been eliminated or almost eliminated, the position of the work chucking/inserting apparatus 60 can be regarded as corresponding to the exact position of the cylinder bore 13. At this time, the axis of a single conical surface defined by the outer surfaces of the six piston chuck fingers 65 and the axis of a single cylindrical surface defined by the inner surfaces of the six piston chuck fingers are aligned with the axis of the cylinder bore 13, and the position of the work chucking/inserting apparatus 60 is memorized.

Since the six piston chuck fingers 65 of the work chucking/inserting apparatus 60, the first robot 20 and the posture control robot 50 function as above, it can be said that they combine together to constitute a tracer mechanism for detecting the position of the cylinder bore 13.

In such a method for detecting the position of the cylinder bore 13, the extent of relative positional deviation and that of rotational deviation, of the cylinder bore 13 with respect to the work chucking/inserting apparatus 60, are detected as electrical values and instructions are given to controllers of the first robot 20 and the posture control robot 50, causing the work chucking/inserting apparatus 60 to move in the XZ plane or to rotate around the XYZ shafts so as to eliminate those deviations. Instead of such an electrical method there may be adopted a mechanical method.

An example of a mechanical method is a known method using a floating mechanism. According to this method, a floating mechanism is used as a substitute for the force sensor 69 used in the above electrical method. In this case, the tip end portion of the work chucking/inserting apparatus 60, i.e., the tips of the six piston chuck fingers 65 of the work chucking/inserting apparatus 60, are brought into pressure contact with the inlet of the cylinder bore 13 and are then inched longitudinally (in the Y direction). As a result, the floating mechanism allows the work chucking/inserting apparatus 60 to slide in the XZ plane, permitting an automatic alignment.

As shown in FIGS. 2 and 3, a mounting arm 70 projects from the back of the force sensor 69 attached to the work chucking/inserting apparatus 60 and is secured rotatably to a third frame 54 of the posture control robot 50, whereby the work chucking/inserting apparatus 60 is suspended from the posture control robot 50. A motor 51 is fixed to the third frame 54 and a rotary shaft thereof is connected to the mounting arm 70 so as to prevent relative rotation thereof. Thus, with the motor 51, the work chucking/inserting apparatus 60 can be rotated around the $\theta_x$ axis. The third frame 54 is suspended from a second frame 55 so that it can be rotated around the $\theta_y$ axis by means of a motor 52.

The second frame 55 is suspended from a first frame 56 so that it can be rotated around the $\theta_z$ axis by means of a motor 53. The first frame 56 is fixed to the Y shaft of the first robot 20. In this way the posture control robot 50 is supported by the first robot 20.

Since the work chucking/inserting apparatus 60 is thus suspended from the posture control robot 50 and the posture control robot 50 is thus supported by the first robot 20, it becomes possible to detect the position of the cylinder bore 13, utilizing the tracer mechanism and an aligned insertion of an assembly 61 into the cylinder bore 13.

A more detailed description will be given below of the operations of the work chucking/inserting apparatus 60, the posture control robot 50 and the first and second robots 20, 30.

When the position of the cylinder bore 13 is detected in the manner described above, the axis of the cylinder bore 13 and that of a single conical surface defined by the arrangement of the outer surfaces of the six piston chuck fingers 65 or of a single cylindrical surface defined by the arrangement of the inner surfaces of the six piston chuck fingers are aligned with each other and the position of the work chucking/inserting apparatus 60 (the positions on the XYZ shafts and rotational positions around the $\theta_x$, $\theta_y$ and $\theta_z$ axes) at this instant are memorized. Therefore, the first robot 20 then leaves the detected position of the cylinder bore 13 and conveys the work chucking/inserting apparatus 60 to the position of the temporary work (piston) rest 40.

At this time, the axis of a single conical surface defined by the arrangement of the outer surfaces of the six piston chuck fingers 65 is oriented vertical and the six piston chuck fingers 65 are moved so as to become positioned just above a specific piston 62 placed on the temporary work rest 40. The six piston chuck fingers 65 are then moved further downward by the first robot 20 and the motor 66 is turned ON to let the piston chuck fingers 65 advance and retreat radially, whereby the piston chuck fingers 65 can chuck the piston 62. The connecting rod 63 is integral with the piston 62 and is chucked by the paired connecting rod chucking arms 68 in alignment with the piston 62 when the piston chuck fingers 65 chuck the piston 62.

When the six piston chuck fingers 65 have thus chucked the piston 62, the first robot 20 conveys the work chucking/inserting apparatus to the pre-memorized position on the XZ shafts, and the posture control robot 50 causes the work chucking/inserting apparatus 60 to rotate to the prememorized rotational positions around the $\theta_x$, $\theta_y$ $\theta_x$ and $\theta_z$ axes, now ready for the start of the operation for inserting the assembly 61 into the cylinder bore 13.

Then, the first robot 20 conveys the work chucking/inserting apparatus 60 along the Y shaft until the six piston chuck fingers 65 come into abutment against an end face of the inlet of the cylinder bore 13 and inserts the assembly 61 into the cylinder bore 13 from the tip end side of the connecting rod 63. Upon this insertion of the assembly 61 into the cylinder bore 13 the paired chuck arms 31 which have been moved into the cylinder bore 13 from the opposite-side opening of the bore, and which are now in a stand-by state, chuck the tip end portion of the connecting rod 63, then the paired connecting rod chucking arms 68 release the connecting rod 63 and retreat. At the same time, the paired chuck arms 31 also retreat. As a result, the piston 62 is inserted into the cylinder bore 13.

When the six piston chuck fingers 65 have come into abutment against the end face of the inlet of the cylinder bore 13, their outer surfaces are flush with the inner peripheral surface of the cylinder bore 13, and the axis of the cylindrical surface defined by the inner surfaces of the piston chuck fingers 65 is aligned with the axis of the cylinder bore 13, so that the piston 62 is inserted smoothly into the cylinder bore 13.

As noted above, the outer surfaces of the six piston chuck fingers 65 arranged circumferentially at equal intervals define a generally conical shape, which shape is suitable for searching for the position of the insertion hole (cylinder bore 13) for the piston 62. When the outer surfaces of the six piston chuck fingers 65 having such a shape are brought into contact equally with the inlet of the cylinder bore 13, it becomes possible to detect the position of the cylinder bore 13 accurately, and by merely fixing the work chucking/inserting apparatus 60 in the detected position and pushing (drawing) the piston 62, chucked by the inner surfaces of the six piston chuck fingers 65, toward the cylinder bore 13, it becomes possible to insert the piston 62 into the cylinder bore 13 in alignment with the bore. Thus, with an extremely simple structure, the piston 62 can be aligned with and inserted into the cylinder bore 13 in a short time and with high working efficiency.

Because the six piston chuck fingers 65 of the work chucking/inserting apparatus 60 can be advanced and retreated radially, by adjusting the radial advance and retreat of the chuck fingers 65 in accordance with the size of the piston 62, it is possible to chuck, or handle, various sizes of pistons 62 and thus the work chucking/inserting apparatus 60 is suitable for an engine assembling line which is a multi-type mixed production line.

Moreover, in the case where the work chucking/inserting apparatus 60 is provided with a tracer mechanism so that the axis of a conical surface defined by the outer surfaces of the six piston chuck fingers 65 is aligned with the axis of the cylinder bore 13 when the outer surfaces contact the inlet of the cylinder bore 13, mere operation of advancing the outer surfaces of the piston chuck fingers 65 toward the cylinder bore 13 permits detection of the cylinder bore 13 position, and thus the position of the cylinder bore 13 can be detected extremely easily.

Further, since the assembling unit 1 is equipped with a robot for conveying the work chucking/inserting apparatus 60 to the position of the cylinder bore 13 and for controlling the orientation of the work chucking/inserting apparatus 60 so that the piston 62 is inserted into the cylinder bore 13 in alignment with the bore, tracer control for detecting the position of the cylinder bore 13, conveyance of the work chucking/inserting apparatus 60 to the position of the cylinder bore 13 and control of orientation of the work chucking/inserting apparatus 60 with respect to the cylinder bore 13 can all be done automatically by utilizing the robot.

Figure 5:
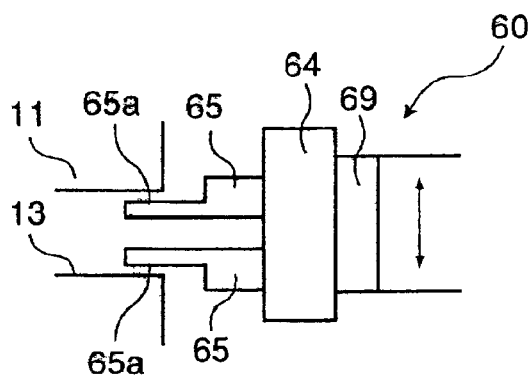
FIG. 5 is an explanatory diagram showing, in a modeled form, the structure of a principal portion of a work chucking/inserting apparatus according to a second embodiment of the invention.

A second embodiment of the invention will now be described with reference to FIG. 5.

In the work chucking/inserting apparatus of the second embodiment, indicated at 60, outer surfaces of six piston chuck fingers 65 are not tapered at their tip end portions 65a, but are arranged on a single (virtual) cylindrical surface, which is formed so as to become parallel to the inner peripheral surface of the cylinder bore 13 when the axis of the cylindrical surface and that of the cylinder bore 13 are aligned with each other. Therefore, when the six piston chuck fingers 65 are retracted radially, the tip end portions 65a of the outer surfaces of the six piston chuck fingers 65 can contact the inner peripheral surface of the inlet portion of the cylinder bore 13. Otherwise, there is nothing else different from the first embodiment, so a detailed description of the other features of the second embodiment will be omitted.

With the second embodiment, if contact pressure variations among the six piston chuck fingers 65, upon contact of the tip end portions 65a of their outer surfaces with the inner peripheral surface of the inlet portion of the cylinder bore 13, are detected with use of a force sensor, such as the force sensor 69 used in the first embodiment, it is possible to detect the position of the cylinder bore 13. In addition, there can be attained the same effects as in the first embodiment. In this second embodiment, the mechanical method using a floating mechanism is most suitable for detecting the position of the cylinder bore 13.

Figure 6:
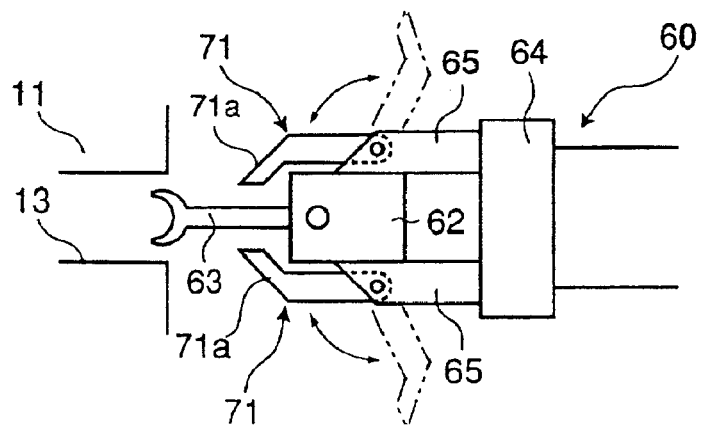
FIG. 6 is an explanatory diagram showing, in a modeled form, the structure of a principal portion of a work chucking/inserting apparatus according to a third embodiment of the invention.

A third embodiment of the invention will now be described with reference to FIG. 6.

In the work chucking/inserting apparatus of this third embodiment, indicated at 60, the function of detecting the cylinder bore 13 and the function of work (piston 62) chucking and inserting are imparted to two separate members. In this regard the third embodiment is different from the first embodiment. More specifically, inner surfaces of piston chuck fingers 65 serve as chuck surfaces for chucking the piston 62, but outer surfaces thereof are not involved in detecting the position of the cylinder bore 13. It is the hole position detecting fingers 71, separate from the piston chuck fingers 65, that serve to detect the position of the cylinder bore 13.

The hole position detecting fingers 71 are provided in the same number, i.e., six, as the piston chuck fingers 65 and are arranged circumferentially at equal intervals. Base end portions of the hole position detecting fingers 71 are pivotally connected to tip end portions of the piston chuck fingers 65 so as to be pivotable inwards and outwards with their pivoted base ends as fulcrums. Like the outer surfaces of the piston chuck fingers 65 in the first embodiment, at least tip end portions 71a of the outer surfaces of the hole position detecting fingers 71 are tapered inward toward their tips for contact with the inner peripheral surface of the inlet portion of the cylinder bore 13.

The piston chuck fingers 65 and the hole position detecting fingers 71 of this third embodiment combine together to provide the same functions as those of the piston chuck fingers 65 used in the first embodiment. The piston chuck fingers 65 used in the first embodiment correspond to the combined piston chuck fingers 65 and hole position detecting fingers 71 used in the third embodiment. After the hole position detecting fingers 71 have detected the position of the cylinder bore 13, they are pivotally moved outwards and therefore are not an obstacle to the insertion of the piston 62 into the cylinder bore 13. Otherwise, this third embodiment no different from the first embodiment, so a further detailed explanation thereof will be omitted.

In the third embodiment, the hole position detecting fingers 71 fulfill the role of detecting the position of the cylinder bore 13 while the piston chuck fingers 65 continue to chuck the piston 62. Thus, it is not necessary for the work chucking/inserting apparatus to go to the temporary rest 40 to fetch a piston 62. Consequently, the piston 62 can be aligned with and inserted into the cylinder bore 13 in a shorter time and with higher working efficiency than in the first embodiment.

Moreover, since the base end portions of the hole position detecting fingers 71 are pivotally connected to the tip end portions of the piston chuck fingers 65, only mechanical error between the hole position detecting fingers 71 and the piston chuck fingers 65 comes into question at the time of inserting the piston 62 into the cylinder bore 13, with the piston chucked by the inner surfaces of the piston chuck fingers 65. Since this error is very small and can be corrected easily, the piston 62 can be aligned with and inserted into the cylinder bore 13 more accurately. In addition, there can be attained the same effects as in the first embodiment.

Figure 7:
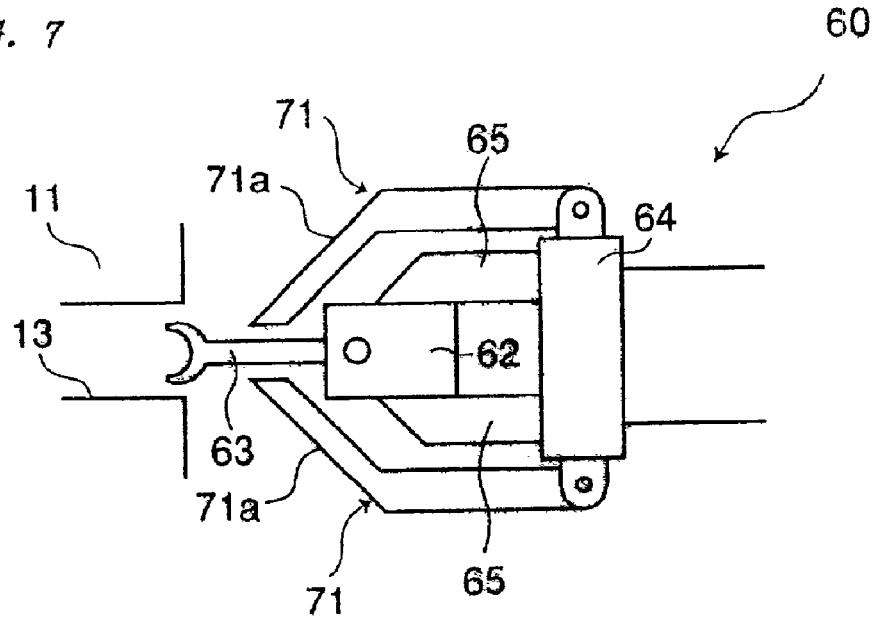
FIG. 7 is an explanatory diagram showing, in a modeled form, the structure of a principal portion of a work chucking/inserting apparatus according to a fourth embodiment of the invention.

A fourth embodiment of the invention will now be described aspect with reference to FIG. 7.

In the work chucking/inserting apparatus 60 of the fourth embodiment, base end portions of six hole position detecting fingers 71 are pivotally connected to an outer periphery of a base portion 64.

Otherwise, this fourth embodiment is the same as the third embodiment, so a further detailed description thereof will be omitted.

In the fourth embodiment, the hole position detecting fingers 71 are pivotally supported more firmly and stably than in the third embodiment. Otherwise, the effects are substantially the same as in the third embodiment.

Figure 8:
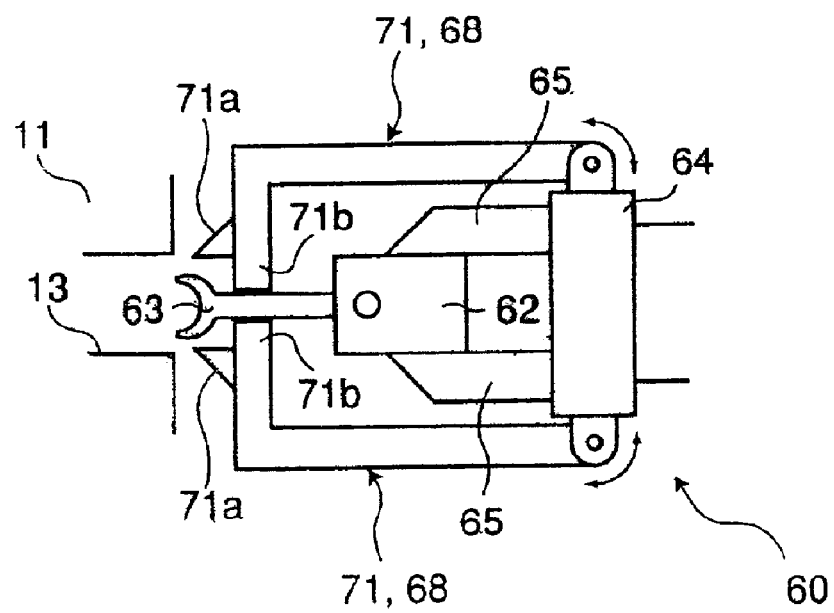
FIG. 8 is an explanatory diagram showing, in a modeled form, the structure of a principal portion of a work chucking/inserting apparatus according to a fifth embodiment of the invention.

A fifth embodiment of the invention will now be described with reference to FIG. 8.

In the work chucking/inserting apparatus 60 of this fifth embodiment, two of the six hole position detecting fingers 71 used in the fourth embodiment serve also as a pair of connecting rod chucking arms 68 (see FIG. 2) for chucking the connecting rod 63.

To this end, the two hole position detecting fingers 71 are respectively formed with extending portions 71b which reach the connecting rod 63 at positions more inward than the tip end portions 71a of the outer surfaces which are tapered for detecting the position of the cylinder bore 13.

The remaining four hole position detecting fingers 71 do not have such extending portions 71b, but are of the same shape, excluding the extending portions 71b, as the two hole position detecting fingers 71. Otherwise, this fifth embodiment is the same as the fourth embodiment, so a further detailed explanation thereof will be omitted.

The fifth embodiment provides a more simplified structure in that the paired connecting rod chucking arms 68 are not separate members different from the hole position detecting fingers 71. Otherwise, this third embodiment provides the same effects as in the fourth embodiment.

The fifth embodiment it is not limited to the two hole position detecting fingers 71 that are also used as the paired connecting rod chucking arms 68. Four hole position detecting fingers, two on the right-hand side and two on the left-hand side, may be used for the same purpose. There also may be adopted a modification wherein one or two hole position detecting fingers 71 are attached to each of the paired connecting rod chucking arms 68.

Figure 9:
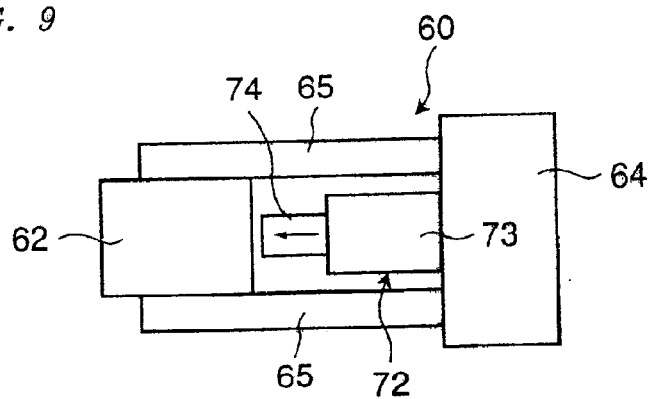
FIG. 9 is an explanatory diagram showing, in a modeled form, the structure of a principal portion of a work chucking/inserting apparatus according to a sixth embodiment of the invention.

A sixth embodiment of the invention will now be described with reference to FIG. 9.

In the work chucking/inserting apparatus 60 of this sixth embodiment, there is provided a pushing mechanism 72 for pushing the piston 62 (workpiece) toward the cylinder bore 13 (insertion hole).

The pushing mechanism 72 is fixed to a base portion 64 on the side where piston chuck fingers 65 are provided, and includes a cylinder 73 and a plunger 74 projecting from the cylinder 73. The plunger 74 is extended with pneumatic pressure or hydraulic pressure toward the cylinder bore 13 and is inserted into the cylinder bore 13. Alternatively, the pushing mechanism 72 may be electrical.

The pushing mechanism 72 used in this sixth embodiment is applicable to any of the previous first to fifth embodiments. Otherwise, this sixth embodiment is not particularly different from the previously described embodiments, so a further detailed description thereof will be omitted.

With the sixth embodiment, when the position of the cylinder bore 13 is detected and the six piston chuck fingers 65 chuck the piston 62, upon alignment of the axis of a (virtual) cylindrical surface defined by the inner surfaces of the piston chuck fingers 65 with the axis of the cylinder bore 13, it becomes possible to push the piston 62 into the cylinder bore 13. Thus, the piston 62 can be aligned with and inserted into the cylinder bore 13 in a shorter time and with a higher working efficiency. Moreover, since the Y shaft of the first robot 20 is not used for pushing the piston 62 into the cylinder bore 13, the piston 62 can be inserted into the cylinder bore 13 with a high accuracy while allowing the piston chuck fingers 65 to substantially stand still.

When the piston 62 is to be pushed into the cylinder bore 13, the piston chuck fingers 65 are slightly retracted radially, so that the chucking force of the six piston chuck fingers 65 for the piston 62 is slightly reduced, whereby the piston 62 is allowed to move toward the cylinder bore 13 while sliding on a cylindrical surface defined by the inner surfaces of the six piston chuck fingers 65. Thus, the piston 62 can be inserted into the cylinder bore 13 smoothly while maintaining its orientation without any damage thereto, while providing the same effects as in the previous first to fifth embodiments.

Figure 10:
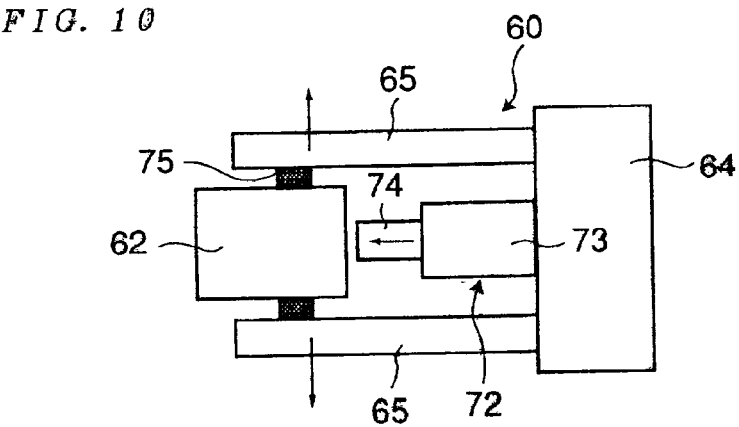
FIG. 10 is a diagram showing a modification of the sixth embodiment illustrated in FIG. 9.

FIG. 10 illustrates a modification of the above sixth embodiment. In this modification, the piston 62 is provided with a piston ring 75 on its outer peripheral surface. The piston ring 75 is fitted in an annular groove formed in the outer peripheral surface of the piston 62 and is resilient. Therefore, a contact force most suitable for the piston ring 75 to slide on the inner chuck surfaces of the piston chuck fingers 65 can be obtained easily by adjusting the extent of retraction of the piston chuck fingers 65.

Figure 11:
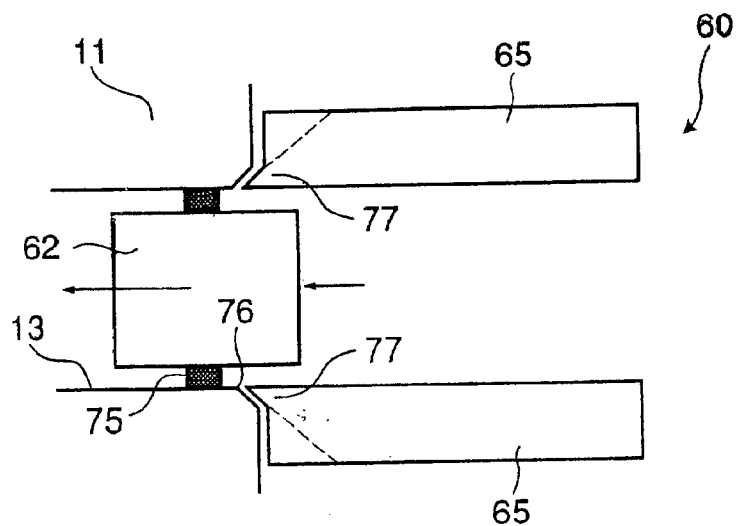
FIG. 11 is an explanatory diagram showing, in a modeled form, the structure of a principal portion of a work chucking/inserting apparatus according to a seventh embodiment of the invention.

A seventh embodiment will now be described with reference to FIG. 11.

In the work chucking/inserting apparatus 60 of th is seventh embodiment, the inlet of the cylinder bore 13 is chamfered at 76, while tip end portions of six piston chuck fingers 65 are respectively formed with projections 77 which mate with the chamfered portion 76. Therefore, when the tips of the six piston chuck fingers 65 are abutted against the inlet end face of the cylinder bore 13, upon insertion of the piston 62 chucked by the six piston chuck fingers 65 into the cylinder bore 13, the projections 77 mate with the chamfered portion 76.

The chamfered inlet of the cylinder bore 13 and the projections of the tip end portions of the piston chuck fingers 65 which mate with the chamfered portion in this seventh embodiment, are applicable to all of the first to sixth embodiments. Particularly, in the case where the tip end portions of the outer surfaces of the piston chuck fingers 65 are tapered as in the first embodiment, this taper structure can be utilized in accordance with this seventh embodiment (see chain lines in FIG. 11). Otherwise, this seventh embodiment is the same as the previously described embodiments, so a further detailed explanation thereof will be omitted.

With the seventh embodiment as described above, a continuous annular recess (groove) of a wedge-like section is not formed in the chamfered portion 76 when the piston 62 is inserted into the cylinder bore 13. Consequently, there is no fear of the front edge of the piston 62 being caught in such an annular recess and hence the piston 62 is inserted smoothly into the cylinder bore 13. Particularly in the case where the piston 62 is provided with the piston ring 75 as in the previous modification, there is no fear that the piston ring 75, which can behave independently of the piston 62, may drop into the annular recess.

An eighth embodiment of the invention will now be described in with reference to FIGS. 12 and 13.

In the work chucking/inserting apparatus 60 of this eighth embodiment, the structures of the work chucking/inserting apparatuses 60 described in the first, sixth and seventh embodiments are united, and the inner surfaces of the chuck fingers are also tapered inward to their tips.

Figure 12:
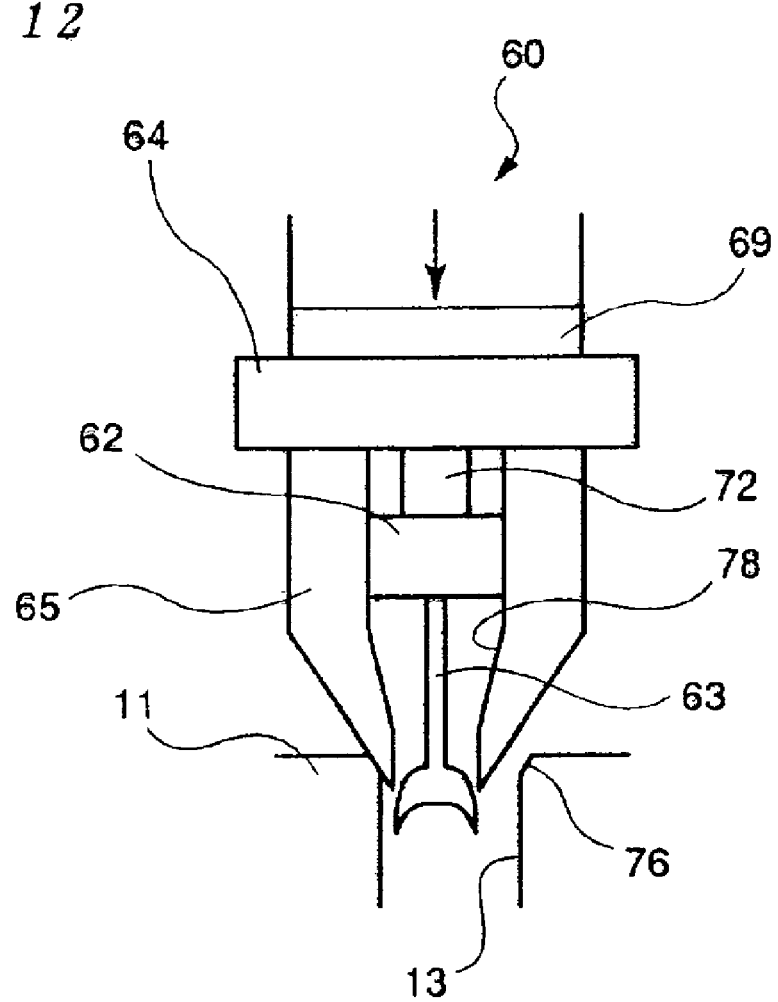
FIG. 12 is an explanatory diagram showing, in a modeled form, the structure of a principal portion of a work chucking/inserting apparatus according to an eighth embodiment of the invention.
Figure 13:
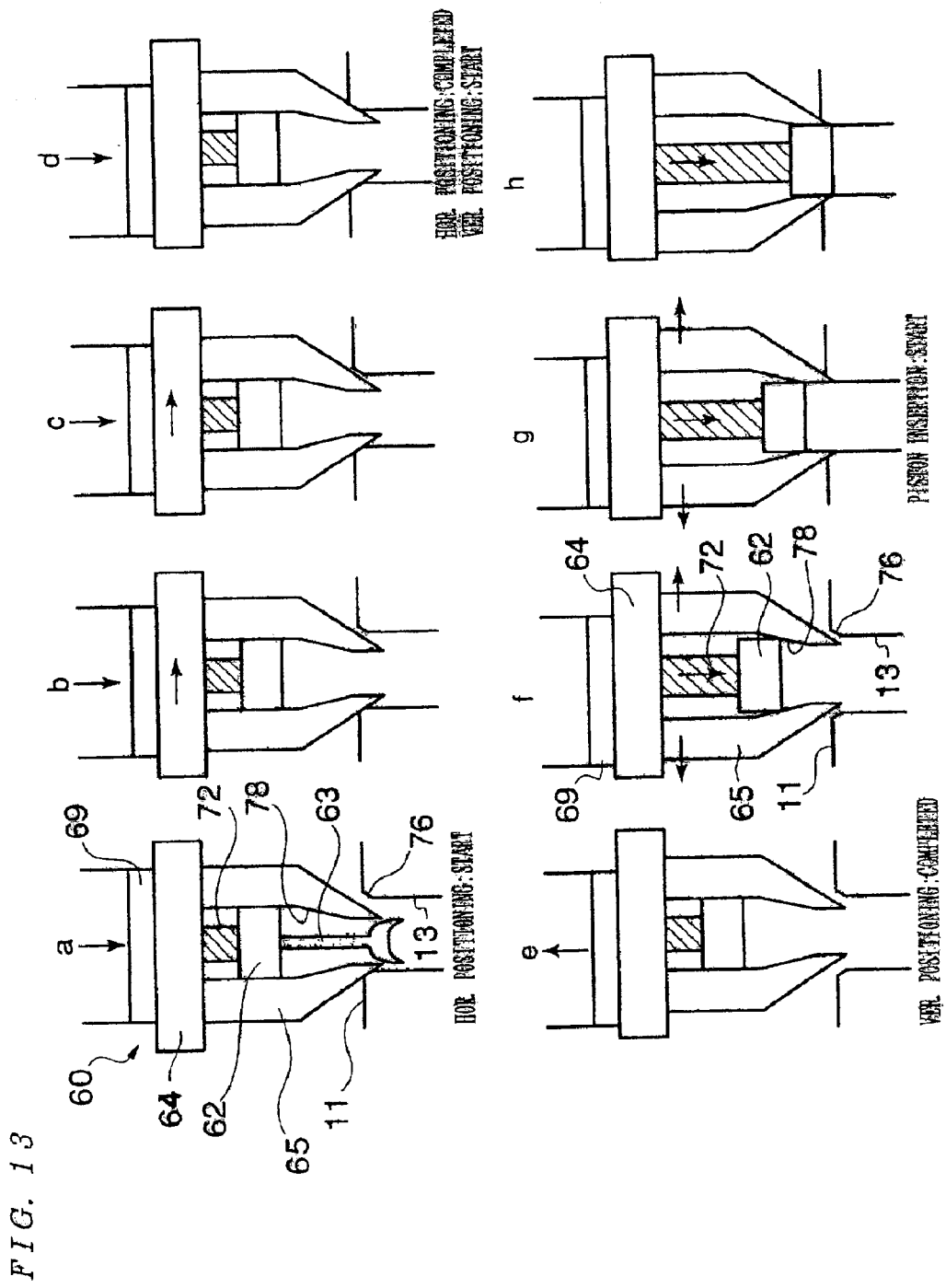
FIG. 13 is a diagram showing a series of operations of the work chucking/inserting apparatus illustrated in FIG. 12.

In the work chucking/inserting apparatus 60 of this eighth embodiment, in comparison with the first embodiment, as shown in FIGS. 12 and 13, there is further provided a pushing mechanism 72 for pushing the piston (work) 62 toward the cylinder bore (insertion hole) 3, and the inner surfaces of the chuck fingers 65 respectively have tapered portions 78 which taper inward closer to the tips and serve as chuck surfaces for chucking the piston 62. Further, the inlet of the cylinder bore 13 is chamfered at 76 and the tips (extremities) of the outer surfaces of the chuck fingers 65 are formed so that they can abut against the chamfered portion 76 without leaving any gap when the piston 62 is inserted into the cylinder bore 13 (see FIGS. 13g and 13h). Otherwise, the eighth embodiment is the same as the first embodiment, so a further detailed explanation thereof will be omitted.

Operation of the eighth embodiment will now be described with reference, as an example, to the case where the work chucking/inserting apparatus 60 is used in a vertically installed state.

In this eighth embodiment; when the work chucking/inserting apparatus 60 detects the position of the cylinder bore 13, the inner surfaces of the chuck fingers 65 have already chucked the piston 62.

The work chucking/inserting apparatus 60 with the piston 62 thus already chucked by the chuck fingers 65 is first advanced (lowered), allowing the tapered tip end portions of the outer surfaces of the chuck fingers 65 to come into contact with one side of the chamfered portion 76 of the inlet of the cylinder bore 13, as shown in FIG. 13a. Next, the work chucking/inserting apparatus 60 is further advanced, allowing the tip end portions of the outer surfaces of the chuck fingers 65 to follow the chamfered portion 76. At the same time, the base portion 64, together with the chuck fingers 65, is moved gradually to the right in FIG. 13 by operation of the floating mechanism 69 serving as a tracer mechanism (FIGS. 13b-d). When the work chucking/inserting apparatus 60 has been inserted to an extent where it cannot further advance, the tip end portions of the outer surfaces of all the six chuck fingers 65 are in contact with the chamfered portion 76, without any gap therebetween, and the detection of the position of the cylinder bore 13 (horizontal positioning of the work chucking/inserting apparatus 60) is completed (FIG. 13d).

Next, the work chucking/inserting apparatus 60 is retracted (raised) to the position at which the tips of the chuck fingers 65 have advanced into the cylinder bore 13 by a distance corresponding to the vertical length (in the axial direction of the cylinder bore 13) of the chamfered portion 76, to complete a vertical positioning of the work chucking/inserting apparatus 60 (FIG. 13e). Then, the plunger of the pushing mechanism 72 is extended to push the piston 62, allowing the piston to slide on the tapered portions 78 of the inner surfaces of the chuck fingers 65. As a result, the tip end portions of the outer surfaces of the chuck fingers 65 are gradually expanded radially outwards (FIGS. 13f–h), permitting the piston 62 to pass through the expanded passage (piston insertion path). Thus, the piston 62 can be inserted into the cylinder bore 13 positively and smoothly while being guided by the tapered portions 78 without disengagement from the chuck fingers 65. At this time, the tips of the outer surfaces of the chuck fingers 65 abut the chamfered portion 76 without leaving any gap therebetween.

Since this eighth embodiment is constructed and operates as above, the work chucking/inserting apparatus 60 need not move to the temporary rest 40 to fetch a piston 62, and the work for detecting the position of the cylinder bore 13 can be done while the piston 62 is chucked by the inner surfaces of the chuck fingers 65. Therefore, the piston 62 can be aligned with and inserted into the cylinder bore 13 in a still shorter time and with a higher working efficiency. Thus, it contributes to improvement of productivity in an engine assembly line. Besides, even without any special hole position detecting fingers (see the third embodiment) separate from the chuck fingers 65 for chucking the piston 62, it is not necessary for the work chucking/inserting apparatus to go to the piston feed place to fetch a piston 62, thereby simplifying the structure of the work chucking/inserting apparatus 60.

Further, since the mechanical floating mechanism 69 is used as the tracer mechanism, the work chucking/inserting apparatus 60 is simple in structure and low in cost, not using any complicated force control. In addition, there can be attained the same effects as in the first, sixth and seventh embodiments.

Figure 14:
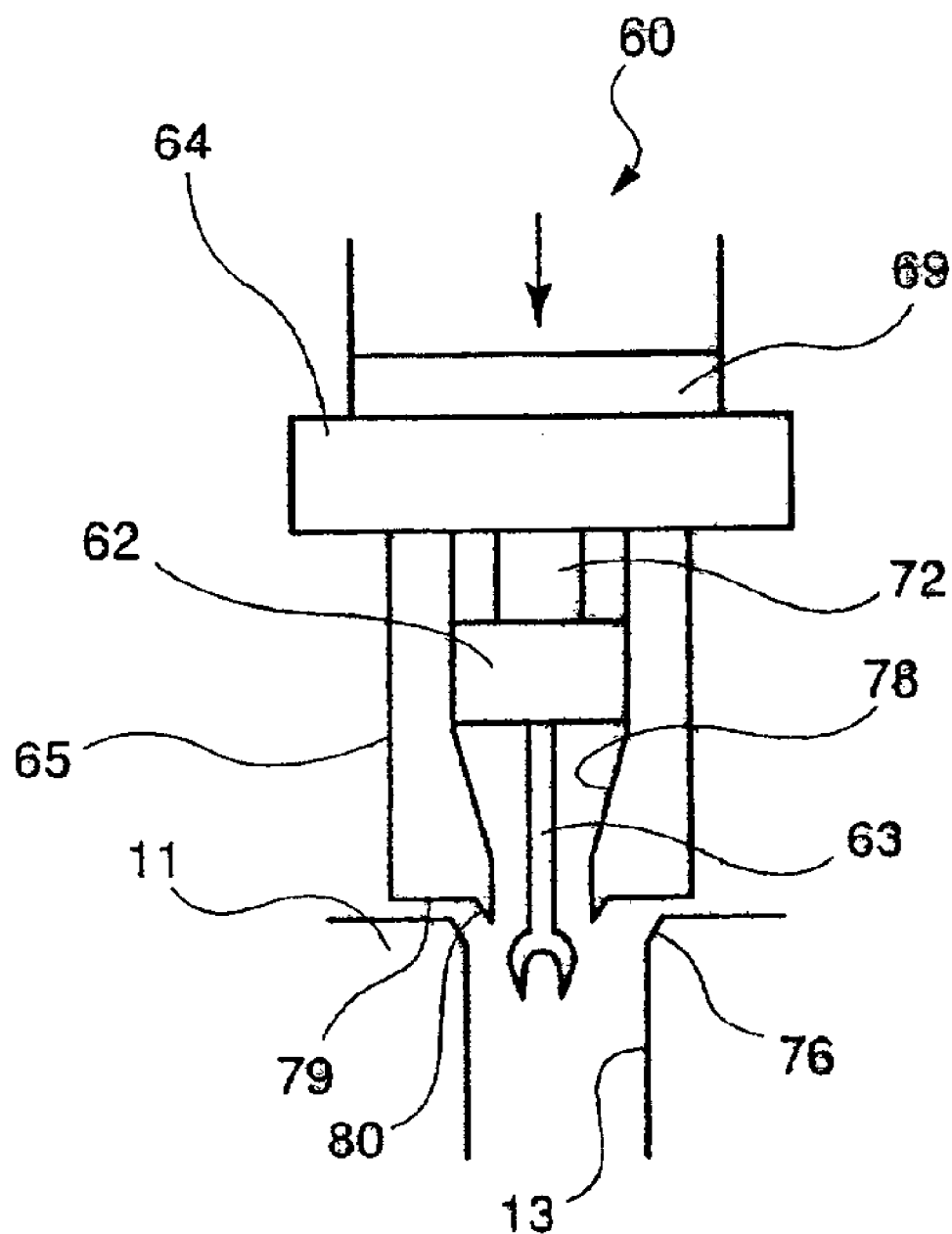
FIG. 14 is an explanatory diagram showing, in a modeled form, the structure of a principal portion of a work chucking/inserting apparatus according to a ninth embodiment of the invention.

A ninth embodiment of the invention will now be described aspect with reference to FIGS. 14 and 15.

The work chucking/inserting apparatus 60 of this ninth embodiment is different from that of the eighth embodiment in the shape of outer surfaces of chuck fingers 65 which function, not only to detect the position of the insertion hole, but also to effect positioning of the work chucking/inserting apparatus 60. More specifically, in the eighth embodiment, as in the first embodiment, the outer surfaces of the chuck fingers 65 are tapered at least at their tip end portions, inward toward their tips, for contact with the inlet of the cylinder bore 13. However, in this ninth embodiment, end faces of the chuck fingers 65 are formed flat ("flat portions" hereinafter), exclusive of their inner edges and the vicinities thereof, for abutment against the wall surface which surrounds the inlet of the cylinder bore 13, and the inner peripheral edges and the vicinities thereof are tapered at 80 inwardly towards the tips for contact the inlet of the cylinder bore 13. Further, the outer surfaces of the chuck fingers 65 are generally arcuate and perpendicularly contiguous with the end faces of the chuck fingers, not being particularly involved in the detection of the insertion hole position or positioning of the work chucking/inserting apparatus 60.

In this ninth embodiment, the inner peripheral edges of the end faces of the chuck fingers 65 and the vicinities thereof are formed so that they can abut against the chamfered portion 76 without leaving any gap upon insertion of the piston 62 into the cylinder bore 13 (see FIGS. 15f and 15g) and so that the axis of a conical surface defined by the inner peripheral edges of the end faces of all the six chuck fingers 65 is aligned with the axis of the cylinder bore 13 when those inner peripheral edges come into contact with the inlet of the cylinder bore 13. Other than the foregoing features, the ninth embodiment is no different from the previous eighth embodiment, so a further detailed explanation thereof will be omitted.

The operation of the ninth embodiment will now be described below with reference, as an example, to the case where the work chucking/inserting apparatus 60 is used oriented vertically.

The ninth embodiment is different from that of the eighth embodiment in the sequence of operations and both in the detecting of the position of the insertion hole by the work chucking/inserting apparatus 60 (horizontal positioning of the work chucking/inserting apparatus 60) and in the positioning of the work chucking/inserting apparatus 60 at the time of insertion of the work into the insertion hole (vertical positioning of the work chucking/inserting apparatus 60).

In connection with the sequence of operations, in the previous eighth embodiment the detecting of the position of the cylinder bore 13 by the work chucking/inserting apparatus 60 (horizontal positioning of the work chucking/inserting apparatus 60) occurs first, followed by positioning the work chucking/inserting apparatus 60 at the time of insertion of the piston 62 into the cylinder bore 13 (vertical positioning of the work chucking/inserting apparatus 60), whereas this sequence is reversed in this ninth embodiment.

Figure 15:
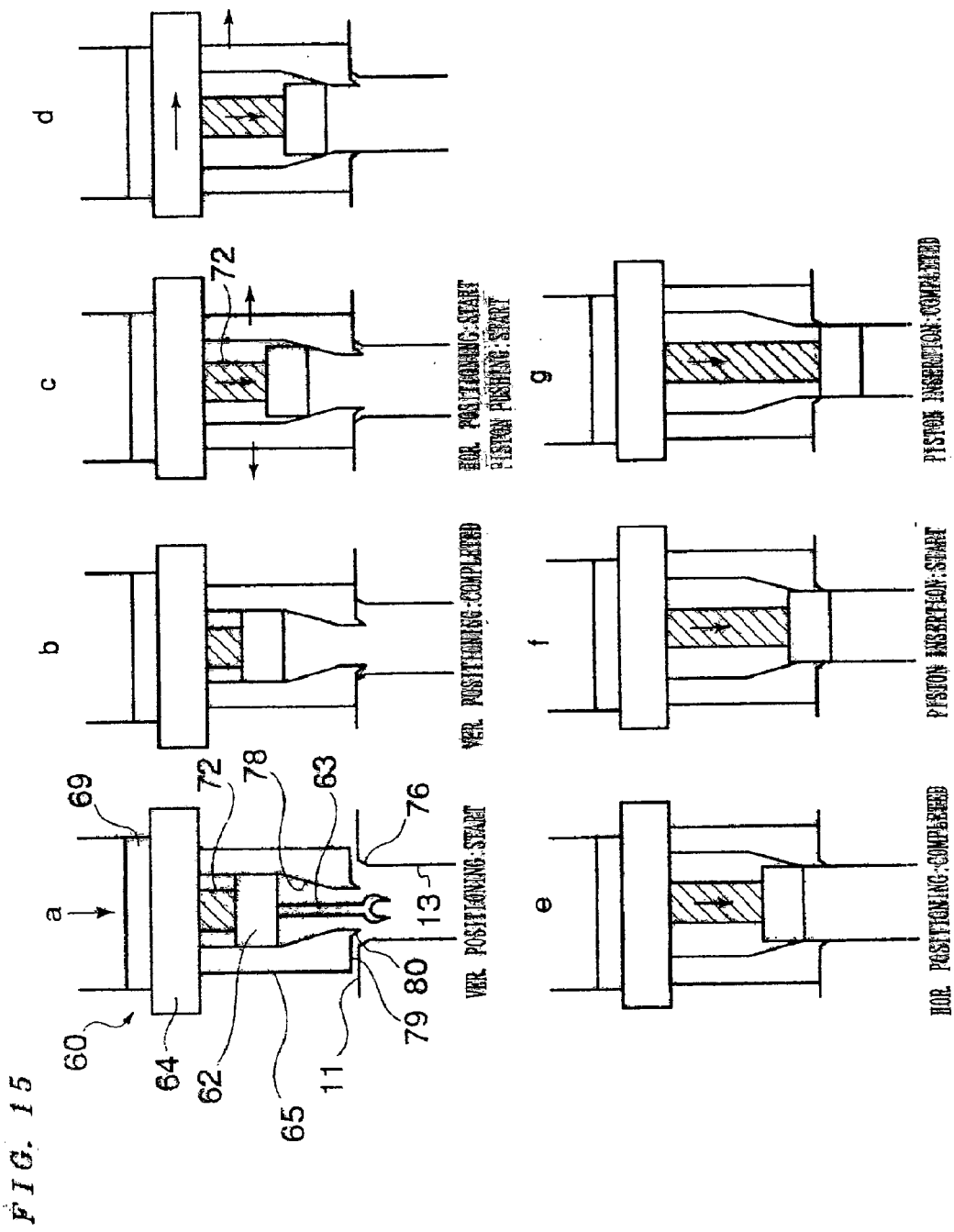
FIG. 15 is a diagram showing a series of operations of the work chucking/inserting apparatus illustrated in FIG. 14.

In the ninth embodiment, as shown in FIG. 15a, the work chucking/inserting apparatus 60 with the piston 62 already chucked by the chuck fingers 65 is first advanced (lowered), to bring flat portions 79 of end faces of the chuck fingers 65 into abutment against the wall surface which surrounds the inlet of the cylinder bore 13, whereby the vertical positioning of the work chucking/inserting apparatus 60 is completed (FIG. 15b). Next, the plunger of the pushing mechanism 72 is extended to push the piston 62, allowing the piston 62 to slide on the tapered portions 78 of the inner surfaces of the chuck fingers 65, whereby the tips of the chuck fingers 6S (the tapered portions 80 of the inner peripheral edges of the end faces and the vicinities thereof) are gradually expanded radially outwards to an equal extent for all of the six chuck fingers 6S, allowing the tips of the chuck fingers 65 to follow the chamfered portion 76. At the same time, the base portion 64, together with the chuck fingers 65, is gradually moved rightwards in FIG. 15 by operation of the floating mechanism 69 serving as a tracer mechanism (FIGS. 15c-e).

In this way it becomes possible for the piston 62 to pass through an expanded passage (piston insertion path) which results when the tips of the chuck fingers 65 are moved radially outwards, and the tapered portions 80 of the inner peripheral edges and the vicinities thereof of the end faces of all the six chuck fingers 65 come into contact with the chamfered portion 76 to complete the operation of detecting the position of the cylinder bore 13 (horizontal positioning of the work chucking/inserting apparatus 60) (FIG. 15e).

Next, the plunger of the pushing mechanism 72 is further extended to push the piston 62, whereby the piston 62 can be inserted into the cylinder bore 13 without disengagement from the chuck fingers 65. At this time, the tapered portions 80 of the end face inner peripheral edges and the vicinities thereof of the chuck fingers 65 are in abutment against the chamfered portion 76 without any gap.

With the ninth embodiment as described above, when the work chucking/inserting apparatus 60 detects the position of the cylinder bore 13, the flat end face portions 79 of the chuck fingers 65 serve as surfaces for positioning the work chucking/inserting apparatus 60 in the axial direction of the cylinder bore 13, and the apparatus 60 can be brought to a standstill in that direction, with elimination of any axial deflection. These features combine to improve the accuracy of detecting the position of the cylinder bore 13. Moreover, the detection of the position of the cylinder bore 13 and the insertion of the piston 62 into the cylinder bore 13 can be done simultaneously. Consequently, the piston 62 can be aligned with and inserted into the cylinder bore 13 with a yet shorter time and with a higher yet working efficiency.

A tenth embodiment of the invention will now be described with FIG. 16.

The work chucking/inserting apparatus 60 of the tenth embodiment is different from the previously described eighth and ninth embodiments in that it uses a pushing mechanism 72 possessing a vacuum chucking function for holding the work (piston 62). To be more specific, a plunger which constitutes the pushing mechanism 72 is formed with a through-hole communicating with a vacuum source, though not shown in detail.

By way of comparison, in the operations of the eighth embodiment illustrated in FIG. 13f, et seq., the plunger of the pushing mechanism 72 is extended to push the piston 62, and the piston 62 slides on the tapered portions 78 of the inner surfaces of the chuck fingers 65, thereby gradually expanding the tips of the chuck fingers 65 radially outwards to permit the piston 62 to pass through the thus-expanded passage (piston insertion path) into the cylinder bore 13 without disengagement from the chuck fingers 65. On the other hand, in this tenth embodiment, the radially outward expansion of the tips of the chuck fingers 65 is performed by operation of a base portion 64 which holds the chuck fingers 65 in a manner for radial extension and retraction.

Figure 16:
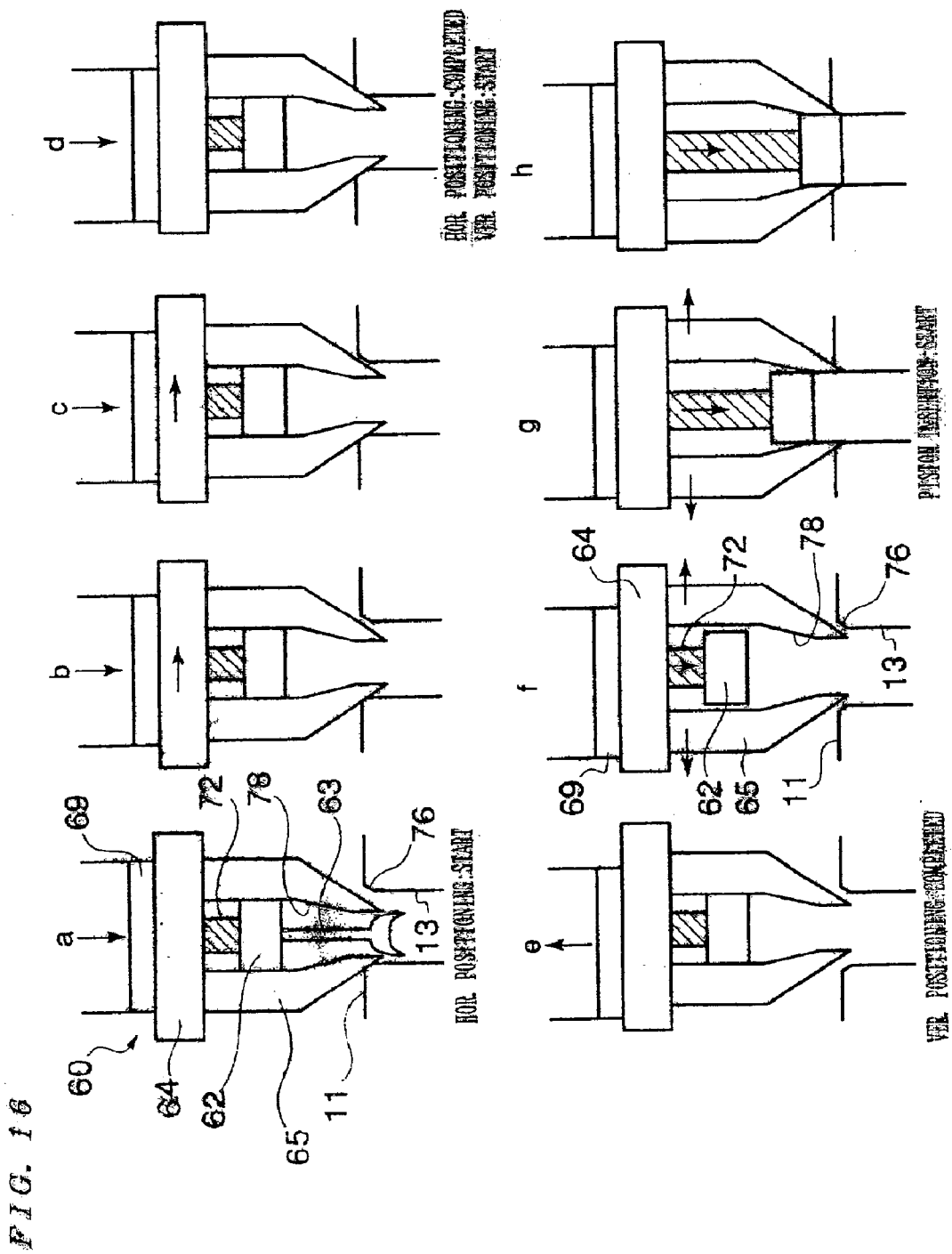
FIG. 16 is a diagram showing a series of operations of a work chucking/inserting apparatus according to a tenth embodiment of the invention.
Figure 17:
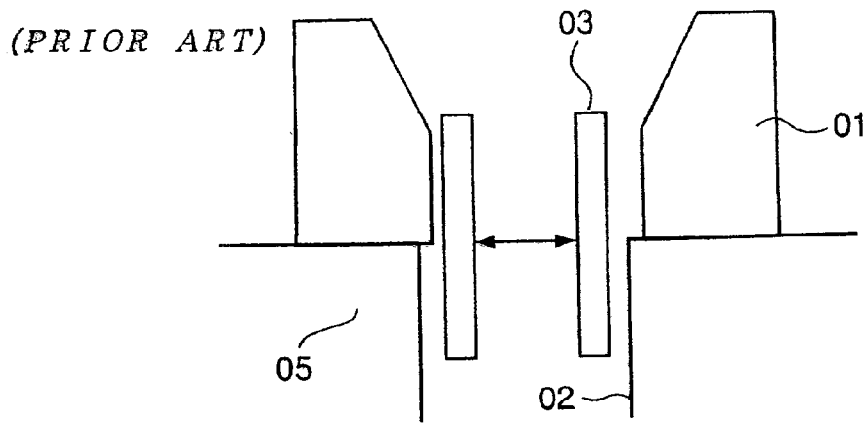
FIG. 17 is a diagram showing an operational step of insertion of a work into an insertion hole with use of a conventional inserting jig.
Figure 18:
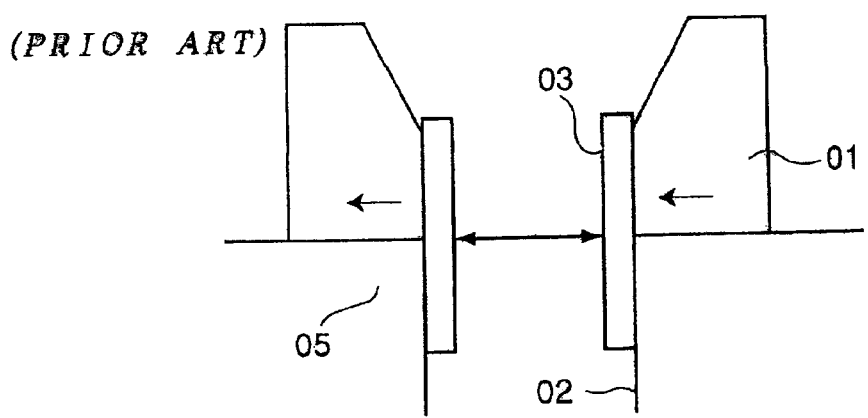
FIG. 18 is a diagram showing another step using the conventional inserting jig.
Figure 19:
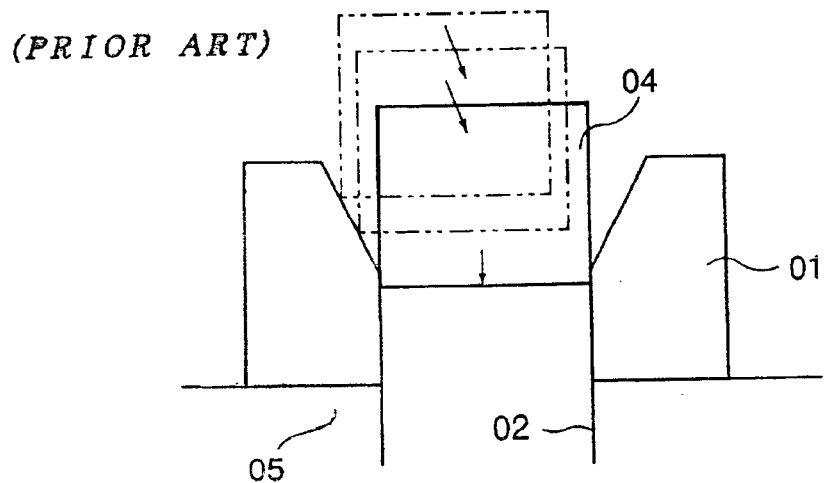
FIG. 19 is a diagram showing a further step using the conventional inserting jig.

In the tenth embodiment, when the tip ends of the chuck fingers 65 are expanded radially outwards by operation of the base portion 64, the piston 62 is released from the chuck fingers 65, but is not disengaged from the work chucking/inserting apparatus 60 because the piston 62 is vacuum chucked by the plunger of the pushing mechanism 72 (FIG. 16). When continued operation of the base portion 64 has expanded the tips of the chuck fingers 65 radially outwards into abutment against the chamfered portion 76, the plunger of the pushing mechanism 72 is extended to push the piston 62 gradually, whereby the piston 62 can be inserted into the cylinder bore 13 (FIGS. 16f-h). In this case, the degree of expansion of the tips of the chuck fingers 65 caused by operation of the base portion 64 is preferably adjusted so that the piston 62 is allowed to slide only the last slight distance on the tapered portions 78 of the inner surfaces of the chuck fingers 65, whereby the tapered portions 78 can be allowed to serve as a guide for insertion of the piston 62 into the cylinder bore 13.

In the ninth embodiment illustrated in FIG. 15c et seq., the plunger of the pushing mechanism 72 is extended to push the piston 62, allowing the piston 62 to slide on the tapered portions 78 of the inner surfaces of the chuck fingers 65, thereby gradually expanding the tips of the chuck fingers 65 (the tapered portions 80 of the inner peripheral edges of end faces and the vicinities thereof) radially outwards so as to permit the piston 62 to pass through the thus-expanded passage (piston insertion path), and the position of the cylinder bore 13 is detected, whereby the piston 62 can be inserted into the cylinder bore 13 without disengagement from the chuck fingers 65. In contrast, in this tenth embodiment, the radially outward expansion of the tips of the chuck fingers 65 is effected by operation of a base portion 64 which holds the chuck fingers 65.

The operation of the base portion 64 and that of the pushing mechanism 72, as well as the mode of insertion of the piston 62 into the cylinder bore 13 based on those operations, should be fully understood from the above descriptions, so a detailed description thereof will here be omitted.

With the tenth embodiment, even if the inner surfaces of the chuck fingers 65 have already chucked the piston 62 before the work chucking/inserting apparatus 60 detects the position of the cylinder bore 13, there is no fear of the piston 62 being disengaged or dropping from the work chucking/inserting apparatus 60 when the tips of the chuck fingers 65 are expanded radially outwards for passage of the piston 62 or for detecting the position of the cylinder bore 13, because the piston 62 is vacuum chucked by the plunger of the pushing mechanism 72, thus permitting the piston 62 to be inserted positively into the cylinder bore 13. Moreover, there is no fear of damage to the piston 62 because the piston 62 undergoes only little sliding on the tapered inner surface portions 78 of the chuck fingers 65.

Although in all of the above first to tenth embodiments the number of the piston chuck fingers 65 is six, the invention is not so limited, i.e. there may be three or more such fingers. Particularly, the minimum number will suffice if the hole position detecting fingers 71 are provided separately. Even two such fingers will do if a wide chuck surface can be provided.

Further, although in the above first to seventh embodiments the piston 62 is inserted horizontally into the cylinder bore 13, this constitutes no limitation. The piston may be inserted into the cylinder bore vertically from above. Various other changes and modifications may be made without departing from the gist of the present invention.

What is claimed is:

1. A work chucking/inserting apparatus for chucking a work, for aligning the work with an insertion hole and for inserting the work into the insertion hole, said apparatus comprising:

a pushing mechanism for pushing the work toward the insertion hole;

three or more chuck fingers, said chuck fingers being arranged in circumferentially spaced positions around a central axis and slidably mounted for advancing and retreating radially in a linear line relative to said central axis, inner surfaces of said chuck fingers serving as chuck surfaces for chucking the work, and outer surfaces of said chuck fingers being tapered at least at tip end portions thereof, tapering inward toward said central axis approaching the tips, for contact with an inlet of the insertion hole; and drive means, comprising a motor, for advancing and retracting said chuck fingers radially in a linear line relative to said central axis and for controlling a chucking force exerted by said chuck fingers.

2. A work chucking/inserting apparatus according to claim 1, wherein the inlet of the insertion hole is chamfered, and the tip end portions of said chuck fingers are respectively formed with projections which mate with the chamfered portion when the work is inserted into the insertion hole.

3. A work chucking/inserting apparatus according to claim 1, wherein the work is a piston or an assembly of a piston and a connecting rod, and the insertion hole is a cylinder bore.

4. A work chucking/inserting apparatus for chucking a work, for aligning the work with an insertion hole and for inserting the work into the insertion hole, said apparatus comprising:

three or more chuck fingers, said chuck fingers being arranged in circumferentially spaced positions around a central axis and slidably mounted for advancing and retreating radially in a linear line relative to said central axis, inner surfaces of said chuck fingers serving as chuck surfaces for chucking the work, and outer surfaces of said chuck fingers having at least at tip end portions thereof surfaces extending parallel to said central axis for contact with an inlet of the insertion hole; and tracer means for, when the outer surfaces of said chuck fingers come into contact with the inlet of the insertion hole, reorienting said apparatus to bring said central axis into alignment with a central axis of the insertion hole.

5. A work chucking/inserting apparatus for chucking a work, for aligning the work with an insertion hole and inserting the work into the insertion hole, said apparatus comprising:

three or more chuck fingers and three or more hole position detecting fingers, said chuck fingers being arranged in circumferentially spaced positions around a central axis and slidably mounted for advancing and retreating radially in a linear line relative to said central axis, said hole position detecting fingers being arranged in circumferentially spaced positions and pivotable inwards and outwards relative to said central axis, about pivot points on base end portions thereof, inner surfaces of said chuck fingers serving as chuck surfaces for chucking the work, and outer surfaces of said hole position detecting fingers being tapered at least at tip end portions thereof, tapering inward toward said central axis approaching the tips, for contact with an inlet of the insertion hole; and drive means for advancing and retracting said chuck fingers radially in a linear line relative to said central axis and for controlling a chucking force exerted by said chuck fingers.

6. A work chucking/inserting apparatus according to claim 5, wherein the base end portions of said hole position detecting fingers are pivotally connected to tip end portions of said chuck fingers.

7. A work chucking/inserting apparatus according to claim 5, wherein the base end portions of said hole position detecting fingers are pivotally connected to a base portion, said base portion supporting said chuck fingers for radial advance and retreat.

8. A work chucking/inserting apparatus according to claim 5, wherein the work is an assembly of a piston and a connecting rod, the insertion hole is a cylinder bore, said chuck fingers chuck said piston, and said hole position detecting fingers also serve as means for chucking said connecting rod.

9. a work chucking/inserting apparatus according to claim 5, wherein said drive means comprises a motor.

10. A work chucking/inserting apparatus for chucking a work, for aligning the work with an insertion hole and for inserting the work into the insertion hole, said apparatus comprising:

three or more chuck fingers, said chuck fingers being arranged in circumferentially spaced positions around a central axis and slidably mounted for advancing and retreating radially in a linear line relative to said central axis, inner surfaces of said chuck fingers serving as chuck surfaces for chucking the work and each having a portion tapering inward toward said central axis approaching a distal end thereof, outer surfaces of said chuck fingers being tapered at least at tip end portions thereof, tapering inward toward said central axis approaching the tips, for contact with an inlet of the insertion hole, tracer means for, when the outer surfaces of said chuck fingers come into contact with the inlet of the insertion hole, reorienting said apparatus to bring said central axis into alignment with a central axis of the insertion hole, and pushing means for pushing the work toward the insertion hole.

11. A work chucking/inserting apparatus according to claim 10, wherein the inlet of the insertion hole is chamfered, and the tips of the outer surfaces of said chuck fingers are shaped to mate with the chamfered portion when the work is inserted into the insertion hole.

12. A work chucking/inserting apparatus according to claim 10, wherein the work is a piston or an assembly of a piston and a connecting rod, and the insertion hole is a cylinder bore.

13. A work chucking/inserting apparatus according to claim 10, wherein said pushing means includes a vacuum chuck for holding the work.

14. A work chucking/inserting apparatus for chucking a work, for aligning the work with an insertion hole and for inserting the work into the insertion hole, the insertion hole having a chamfered inlet, said apparatus comprising:

three or more chuck fingers, said chuck fingers being arranged in circumferentially spaced positions around a central axis and slidably mounted for advancing and retreating radially, inner surfaces of said chuck fingers serving as chuck surfaces for chucking the work and each having a portion tapering inward toward said central axis approaching a distal end thereof, end faces of said distal ends of said chuck fingers being at least partially flat for coming into abutment against a wall surface which surrounds an inlet of the insertion hole, projections depending from close to inner peripheral edges of the end faces of said chuck fingers, each of said projections having an outer surface tapering inward toward said central axis approaching a distal end thereof, for mating with the chamfered portion of the inlet of said insertion hole when said work is inserted into said insertion hole, tracer means for, when the outer surfaces of said projections come into contact with the inlet of the insertion hole, reorienting said apparatus to bring said central axis into alignment with a central axis of the insertion hole, and pushing means for pushing said work toward the insertion hole.

15. A work chucking/inserting apparatus for chucking a work, for aligning the work with an insertion hole and for inserting the work into the insertion hole, said apparatus comprising:

a pushing mechanism for pushing the work toward the insertion hole;

three or more chuck fingers, said chuck fingers being arranged in circumferentially spaced positions around a central axis and slidably mounted for advancing and retreating radially in a linear line relative to said central axis, inner surfaces of said chuck fingers serving as chuck surfaces for chucking the work, and outer surfaces of said chuck fingers being tapered at least at tip end portions thereof, tapering inward toward said central axis approaching the tips, for contact with an inlet of the insertion hole; and tracer means for, when the outer surfaces of said chuck fingers come into contact with the inlet of the insertion hole, reorienting said apparatus to bring said central axis into alignment with a central axis of the insertion hole.

16. A work chucking/inserting apparatus for chucking a work, for aligning the work with an insertion hole and for inserting the work into the insertion hole, said apparatus comprising:

a pushing mechanism for pushing the work toward the insertion hole;

three or more chuck fingers, said chuck fingers being arranged in circumferentially spaced positions around a central axis and slidably mounted for advancing and retreating radially in a linear line relative to said central axis, inner surfaces of said chuck fingers serving as chuck surfaces for chucking the work, and outer surfaces of said chuck fingers having at least at tip end portions thereof surfaces extending parallel to said central axis for contact with an inlet of the insertion hole; and drive means for advancing and retracting said chuck fingers radially in a linear line relative to said central axis and for controlling a chucking force exerted by said chuck fingers.

17. A work chucking/inserting apparatus for chucking a work, for aligning the work with an insertion hole and inserting the work into the insertion hole, said apparatus comprising:

three or more chuck fingers and three or more hole position detecting fingers, said chuck fingers being arranged in circumferentially spaced positions around a central axis and slidably mounted for advancing and retreating radially in a linear line relative to said central axis, said hole position detecting fingers being arranged in circumferentially spaced positions and pivotable inwards and outwards relative to said central axis, about pivot points on base end portions thereof, inner surfaces of said chuck fingers serving as chuck surfaces for chucking the work, and outer surfaces of said hole position detecting fingers being tapered at least at tip end portions thereof, tapering inward toward said central axis approaching the tips, for contact with an inlet of the insertion hole; and tracer means for, when the outer surfaces of said chuck fingers come into contact with the inlet of the insertion hole, reorienting said apparatus to bring said central axis into alignment with a central axis of the insertion hole.

18. A work chucking/inserting apparatus according to claim 17, wherein the base end portions of said hole position detecting fingers are pivotally connected to the tip end portions of said chuck fingers.

19. A work chucking/inserting apparatus according to claim 17, wherein the base end portions of said hole position detecting fingers are pivotally connected to a base portion, said base portion supporting said chuck fingers for radial advance and retreat.

20. A work chucking/inserting apparatus according to claim 17, wherein the inlet of the insertion hole is chamfered, and the tips of the outer surfaces of said hole position detecting fingers are shaped to mate with the chamfered portion when the work is inserted into the insertion hole.

21. A work chucking/inserting apparatus for chucking a work, for aligning the work with an insertion hole and for inserting the work into the insertion hole, said apparatus comprising:

three or more chuck fingers, said chuck fingers being arranged in circumferentially spaced positions around a central axis and slidably mounted for advancing and retreating radially in a linear line relative to said central axis, inner surfaces of said chuck fingers serving as chuck surfaces for chucking the work, and outer surfaces of said chuck fingers being tapered at least at tip end portions thereof, tapering inward toward said central axis approaching the tips, for contact with an inlet of the insertion hole;

hole position detecting means for detecting the position of the insertion hole, said hole position detection means comprising a force sensor for detecting the magnitude and direction of a resultant force of reaction forces which said piston chuck fingers receive from the cylinder bore upon contact therewith.

* * * * *